United States Patent [19]
Niehaus et al.

[11] Patent Number: 6,046,998
[45] Date of Patent: Apr. 4, 2000

[54] ATM REFERENCE TRAFFIC SYSTEM

[75] Inventors: Raymond Douglas Niehaus; Balaji Srinivasan, both of Lawrence, Kans.; Vinai Rajendran Sirkay, Pittsburgh, Pa.; William Lee Edwards, Overland Park; Timothy Gene Kelley, Shawnee, both of Kans.

[73] Assignee: Sprint Communications Co. L.P.

[21] Appl. No.: 08/821,983

[22] Filed: Mar. 20, 1997

[51] Int. Cl.[7] .................................................. H04J 3/00
[52] U.S. Cl. ............................................................ 370/395
[58] Field of Search ................................. 370/253, 232, 370/235, 395, 252, 394

[56] References Cited

U.S. PATENT DOCUMENTS

| | | | |
|---|---|---|---|
| 5,007,043 | 4/1991 | Van Den Dool et al. | 370/232 |
| 5,343,463 | 8/1994 | Van Tetering et al. | 370/253 |
| 5,457,700 | 10/1995 | Merchant | 714/744 |
| 5,469,466 | 11/1995 | Chu | 375/354 |
| 5,598,415 | 1/1997 | Nuber et al. | 370/474 |
| 5,613,129 | 3/1997 | Walsh | 710/262 |
| 5,742,649 | 4/1998 | Muntz et al. | 375/371 |
| 5,757,778 | 5/1998 | Kim et al. | 370/252 |
| 5,761,203 | 6/1998 | Morales | 370/418 |
| 5,764,626 | 6/1998 | VanDervort | 370/232 |
| 5,778,001 | 7/1998 | Nakayama et al. | 370/516 |
| 5,822,383 | 10/1998 | Muntz et al. | 375/362 |
| 5,867,489 | 2/1999 | Hershey et al. | 370/324 |

*Primary Examiner*—Huy D. Vu
*Assistant Examiner*—Dung Trinh
*Attorney, Agent, or Firm*—Harley R. Ball

[57] ABSTRACT

An ATM reference traffic system records packet information representative of ATM packets transmitted over an ATM network. The system also creates and transmits ATM packets from packet information on a schedule representative of ATM packet transmission over an ATM network. The preferred system uses a personal computer with the operating system modified to schedule events with microsecond resolution while providing interrupts to the operating system on a periodic basis.

8 Claims, 27 Drawing Sheets

ATM REFERENCE TRAFFIC SYSTEM

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of telecommunications. More particularly, the invention is concerned with an ATM reference traffic system (ARTS) that records packet information representative of ATM packets transmitted over an ATM network. The system also creates and transmits ATM packets from packet information on a schedule representative of ATM packet transmission over an ATM network using a personal computer with the operating system modified to schedule events with microsecond resolution while providing interrupts on the original periodic basis to the unmodified portions of the operating system.

2. Description of the Prior Art

In the development of more effective telecommunications networks operating in the asynchronous transfer mode (ATM), it is necessary to conduct experiments to evaluate the performance of such networks and the associated equipment. For this purpose, prior art equipment such as the Hewlett Packard J2912A ATM test set has the ability to measure network performance at the ATM cell level. More particularly, this equipment can measure the arrival times of ATM cells over a network in order to provide an indication of delays and missing cells. This information, however, does not allow for reproduction of actual network traffic at network speeds in order to evaluate network performance.

Other equipment in the prior art enables the generation of synthetic ATM traffic generating ATM packets according to probabilistic models. Synthetically generated traffic, however, does not reflect the behavior of an actual ATM network under actual network conditions. In order to overcome these limitations, traces of actual network traffic have been recorded using packet sizes and interarrival times and then used as input to network simulations. Simulations, however, may not reflect accurately the behavior of actual networks.

Another difficulty in evaluating ATM performance is that the test equipment must be able to handle timing with microsecond resolution. Conventional microcomputers have operating systems that operate on a time base of ten milliseconds for providing periodic interrupts. This is much too slow for evaluating the high speed of ATM transmissions. Merely shortening the interrupt interval does not solve the problem because this increases the interrupt service overhead to the point where little processing capacity remains for user processes. As a result, evaluation of ATM networks requires expensive specialized equipment having high speed capability. Even the specialized equipment, however, is primarily for analysis at the ATM cell level and not at the ATM packet level.

SUMMARY OF THE INVENTION

The present invention solves the prior art problems discussed above and provides a distinct advance in the state of the art. More particularly, the preferred ATM reference traffic system hereof enables the accurate recording and reproduction of ATM packet traces using a conventional microcomputer configured for scheduling events with microsecond resolution while maintaining periodic interrupts to the unmodified portions of the operating system at ten milliseconds.

One embodiment of the present invention includes a microcomputer having a modified operating system that controls the interrupts provided by the timer chip according to a schedule having microsecond resolution. The modified operating system loads the timer chip according to the schedule and also intercepts the interrupts. The schedule is configured such that the interrupts prompt the occurrence of events such as ATM packet generation and transmission with microsecond precision. The modified operating system, upon receiving a scheduled interrupt, monitors the remaining time to a scheduled event using the instruction clock of the microprocessor, which provides a time resolution shorter than one microsecond.

By intercepting the timer chip interrupts, the modified operating system prevents the unmodified portions of the operating system from initiating their interrupt-based subroutines with every interrupt. The modified operating system continues to provide the periodic interrupts at ten milliseconds resolution to the unmodified portions of the operating system.

In another embodiment of the invention, the preferred system can be coupled with an ATM network for receiving ATM traffic with a specified virtual channel identification (VCI). The system includes a network interface for producing packet information representative of ATM packets included in the ATM traffic. This packet information includes the arrival time, VCI, and data size. The data size is the number of bytes of data included in the packet. The time data is representative of the time of arrival of the packet as determined by the time stamp unit of the microprocessor. The microcomputer stores this packet information.

Another embodiment of the invention creates and transmits ATM packets using the stored data size, VCI, and stored time data. In the preferred embodiment, the stored time data is used to configure a schedule that has microsecond resolution. Other preferred aspects of the present invention are disclosed herein.

DETAILED DESCRIPTION OF THE PREFERRED EMBODIMENT

The invention comprises a method for providing ATM traffic from a computer controlled by a modified operating system. Since the unmodified operating system tracks time at a particular time resolution, the operating system is modified to track time at a greater time resolution than the particular time resolution of the unmodified operating system. The computer receives ATM packets and stores time data for the ATM packets using the greater time resolution of the modified operating system. The computer also transmits ATM packets using the stored time data and the greater time resolution of the modified operating system.

In various other embodiments, the particular time resolution of the unmodified operating system is ten miliseconds, and the greater time resolution of the modified operating system is at least one microsecond. In addition, the computer may also store data sizes for the ATM packets it receives, and transmit ATM packets using the stored data sizes. The computer may also store virtual connection information for the ATM packets it receives, and transmit ATM packets using the stored virtual connection information. The modified operating system may also track time at the particular time resolution of the unmodified operating system.

Figure 1:
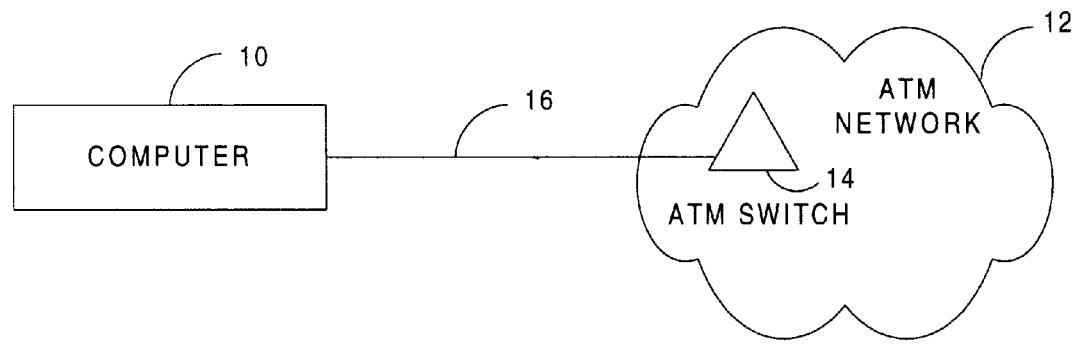
FIG. 1 is a schematic representation of the preferred computer connected with an ATM network.
Figure 2:
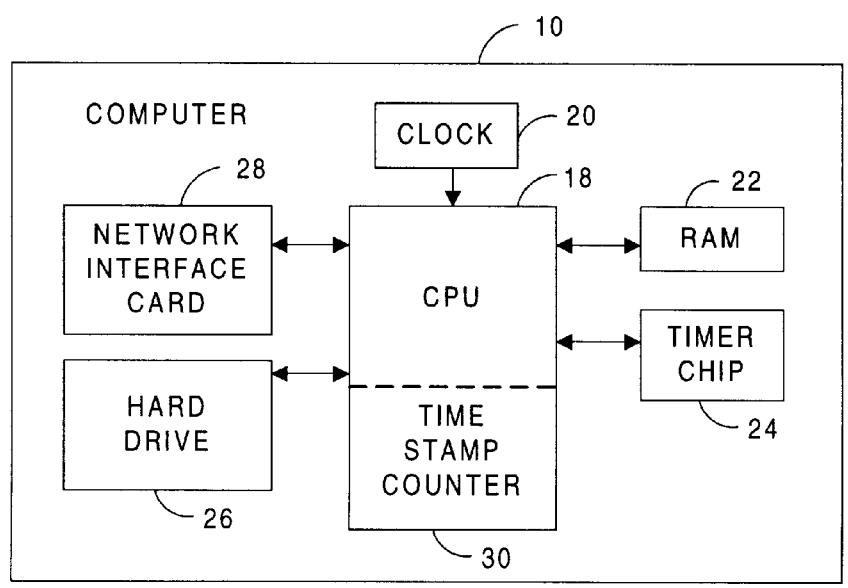
FIG. 2 is a schematic representation of the preferred computer of FIG. 1.

FIG. 1 illustrates preferred computer 10 coupled with ATM network 12 and, in particular, with ATM switch 14 by way of connection 16 for exchange of ATM traffic therebetween. FIG. 2 illustrates selected components of computer 10 which is preferably a conventional microcomputer, also known as a personal computer. Other components not depicted are included as part of a typical personal computer and are well known to those of ordinary skill in the art.

Computer 10 includes microprocessor 18 such as a 100 MHZ PENTIUM brand microprocessor, 100 MHZ clock 20, random access memory (RAM) 22 preferably with 128 MB capacity, timer chip 24, hard disk drive 26 and network interface 28. Microprocessor 18 conventionally includes an internal instruction clock, i.e., time stamp counter (TSC) 30, that increments with each cycle of clock 20 providing the ability for nanosecond accuracy.

Conventional network interface 28 is preferably an ENI ATM Network Interface Card (NIC). Interface 28 has the ability to interrupt the CPU when a packet arrives on a specified VCI from ATM switch 14. Interface 28 provides packet information to microprocessor 18. This packet information includes the VCI and size data in terms of the number of data bits contained in the packet. In addition to the VCI and size data, Clock 20 provides packet arrival times to microprocessor 18. As a result, the VCI, the size data, and the arrival time are collected for each packet.

In order to transmit packets that emulate the traffic received in the manner described above, timer chip 24 provides interrupts to microprocessor 18 at the scheduled packet transmission times. The scheduled transmission times are based on the previously collected arrival times. Microprocessor 18 generates packets based on the size data. Based on the interupt from timer chip 24, microprocessor 18 instructs interface 28 to transmit the generated packets on the associated VCI. In the present invention, the packets are preferably at the ATM Adaptation Layer 5 (AAL5).

A typical personal computer is provided with an operating system loaded from the hard drive when the computer boots. In the present invention, the preferred operating system is the Linux operating system. As with most operating systems, Linux schedules events using timers placed in a timer queue made up of a doubly linked list of timers. Each timer is characterized by the time at which it should expire, the function that should be called when the timer expires, and the data that should be passed to the called function. Thus, whenever the expiration time of the timer is less than the present time, the associated timer function is called and executed. With Linux, as with many other operating systems the timers have a maximum resolution of 10 milliseconds (msec.). This resolution is provided by timer chip 24, which usually generates an interrupt every 10 milliseconds. This is the shortest resolution with which events can be scheduled in the Linux kernel.

It will be appreciated, however, that 10 msec. is insufficient resolution for dealing with high speed ATM networks. In such networks, packets may occur as frequently as every 500 microseconds (usec.). Thus, an effective test device must be able to receive and store packet information with microsecond resolution and also must be able to transmit packets on a schedule with a resolution to the nearest microsecond.

Accordingly, the present invention includes a modified operating system illustrated in FIGS. 3–7 that enables computer 10 to handle events such as receipt and transmission of ATM packets with microsecond resolution. Moreover, this is accomplished without increasing the frequency of interrupt processing by the Linux operating system.

Figure 3:
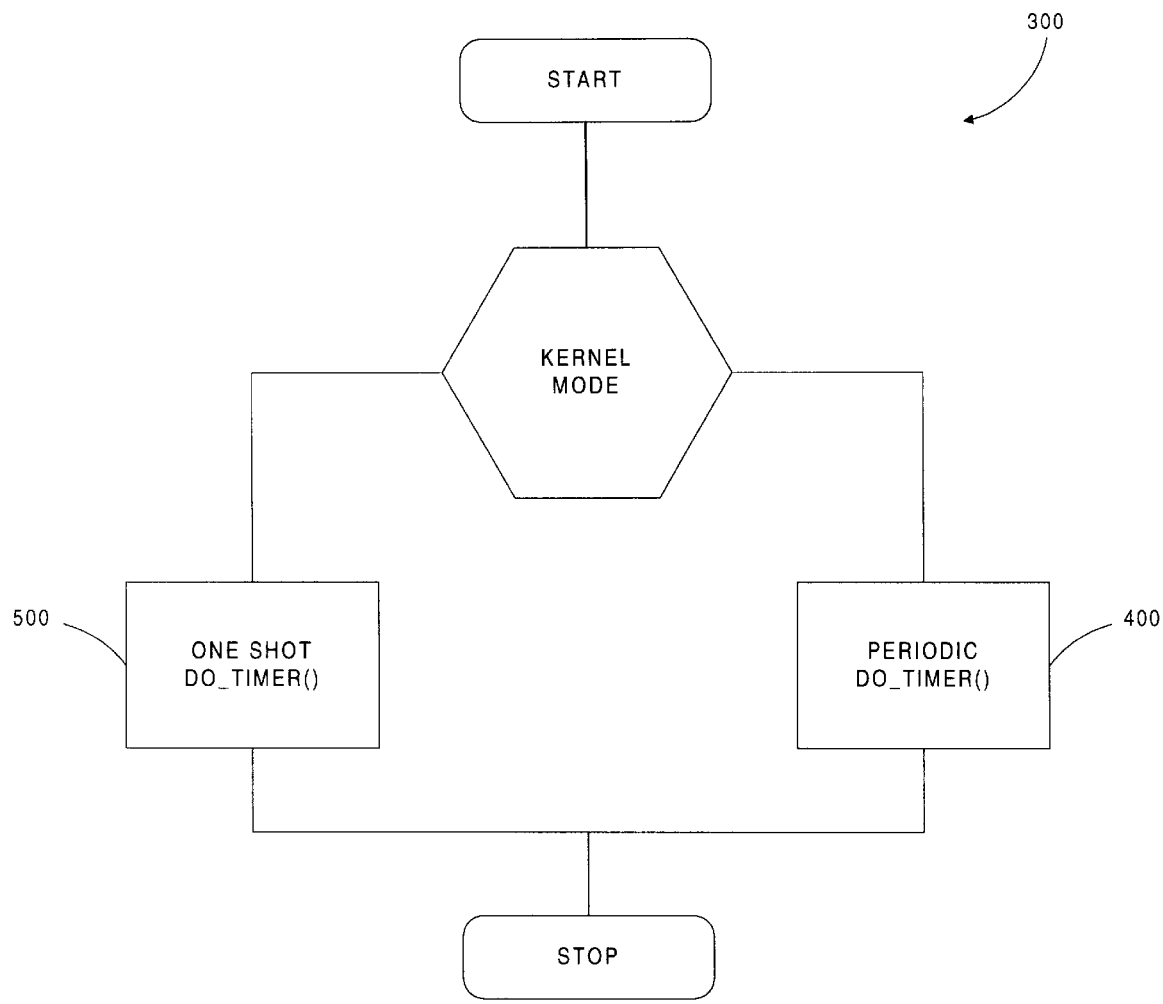
FIG. 3 is a computer program flow chart of the preferred UTIME subroutine for operating the computer of FIG. 1.

FIG. 3 is a computer program flow chart illustrating the UTIME subroutine 300 that modifies the timer interrupt handler of the Linux operating system. In the unmodified Linux system, all that the timer interrupt does is maintain the global time with 10 ms. resolution and call a do-timer function that initiates execution of timer events that have already expired. The UTIME subroutine provides two modes of operation selectable by the user: periodic DO_TIMER 400 (FIG. 4) and one-shot DO TIMER 500 (FIG. 5).

Figure 4:
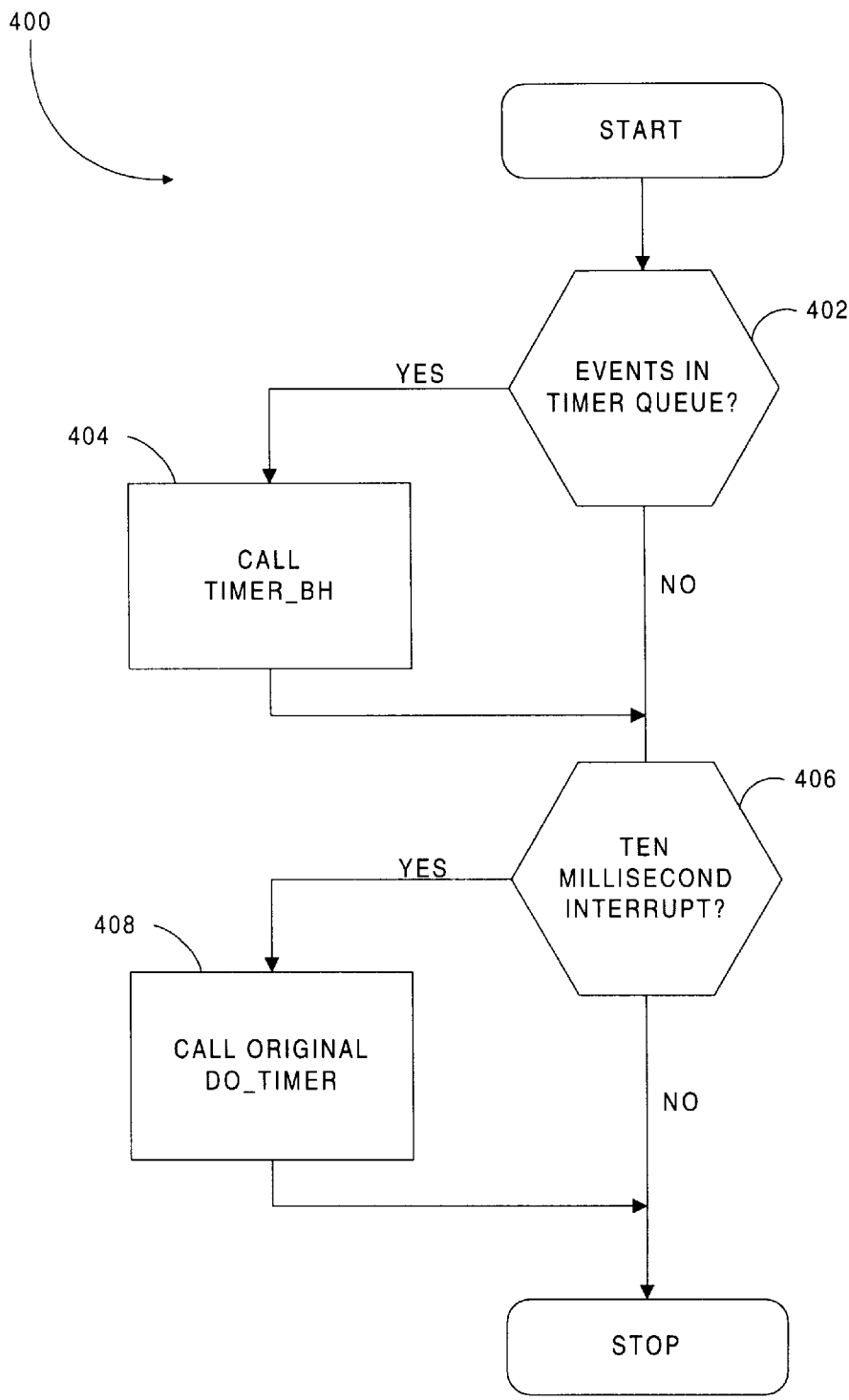
FIG. 4 is a computer program flow chart of the periodic DO_TIMER subroutine for operating the computer of FIG. 1.

Referring to FIG. 4, periodic DO_TIMER 400 updates the time sense of the Linux kernel and checks to determine whether any events in the timer queue have expired. In the periodic mode, timer chip 24 is reloaded with the same value after each expiration and thereby generates interrupts on a periodic basis according to the value loaded into the chip. With the present invention, this timer chip value typically provides interrupts more frequently than every 10 msec, which is the operating system time base. For example, interrupts might be generated every 500 usec., which is a time base shorter than the operating system time base and having microsecond resolution. In FIG. 4, step 402 asks whether there are any expired events in the timer queue. If yes, step 404 calls the Linux module TIMER_BH which in turn calls the timer service routine for the expired timer.

With the present invention, timer chip 24 is loaded with values that generate interrupts much more frequently than the conventional 10 ms. interrupts. The modified operating system of the present invention intercepts the interrupts provided by timer chip 24 in order to prevent initiation of the Linux system interrupt routines more frequently than needed. However, the present invention maintains the scheduled operating system level interrupts every 10 ms. to the unmodified portions of the Linux operating system with step 406. If the answer in step 402 is no, or after step 404, step 406 asks whether 10 ms. have passed since the last time the Linux do-timer was called. If yes, step 408 calls the do-timer module of the Linux operating system which prompts initiation of the 10 ms. interrupt modules. In this way, the time sense of the unmodifies portions of the Linux operating system are unaffected by the modified portion of the operating system. If the answer in step 406 is no, or after step 408, subroutine 400 stops.

Figure 5:
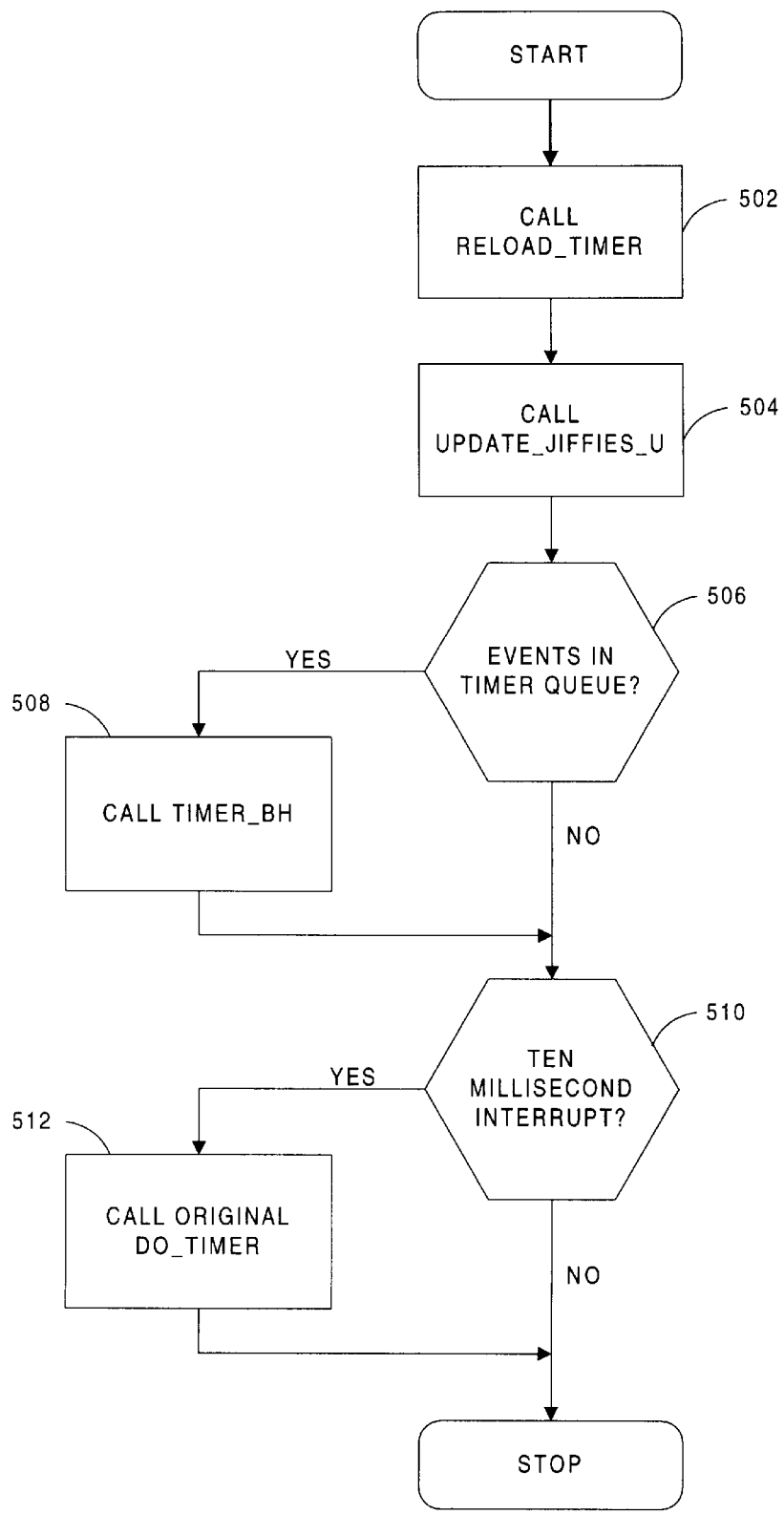
FIG. 5 is a computer program flow chart of the one-shot DO_TIMER subroutine for operating the computer of FIG. 1.

FIG. 5 illustrates one-shot DO_TIMER 500 which loads timer chip 24 with a new value after each interrupt. Specifically, step 502 calls RELOAD_TIMER subroutine 600 (FIG. 6), explained below, to load timer chip 24 with a new value. Next, step 504 calls UPDATE subroutine 700 (FIG. 7), also explained below, which updates the JIFFIES_U microsecond variable. JIFFIES is a variable that provides a time reference to the operating system. (For the Linux operating system, this resolution is at 10 miliseconds.) Steps 506, 508, 510 and 512 are the same as steps 402–408 explained above in connection with FIG. 4.

Figure 6:
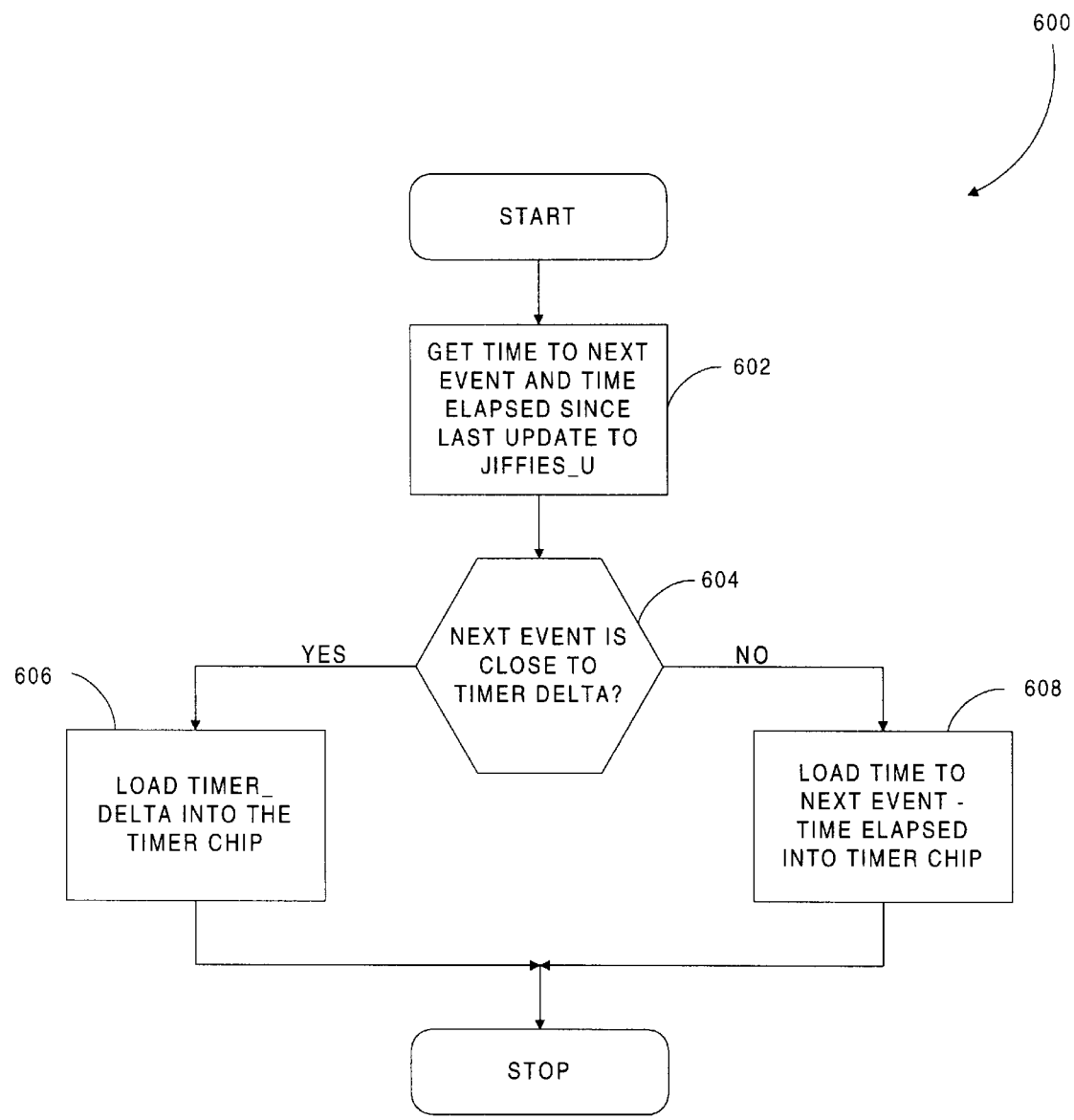
FIG. 6 is a computer program flow chart of the RELOAD_TIMER subroutine for operating the computer of FIG. 1.

FIG. 6 illustrates RELOAD_TIMER subroutine 600 which starts at step 602 called in response to step 502. Step 602 determines the time to the next scheduled event and also determines the time elapsed since the last update to the variable JIFFIES U. Step 604 then asks whether the difference between these values is less than a specified threshold value called TIMER_DELTA which is equal to the time for processing an interrupt routine. That is, if the time to the next event is close to or less than the threshold, the answer in step 604 is yes and step 606 loads the value TIMER DELTA into timer chip 24. If the time to the next event is greater than TIMER_DELTA, then the answer in step 604 is no and step 608 loads the time to the next event into timer chip 24. This is determined by subtracting the time elapsed since the last update to JIFFIES_U from the scheduled time to the next event. Subroutine 600 then stops.

Figure 7:
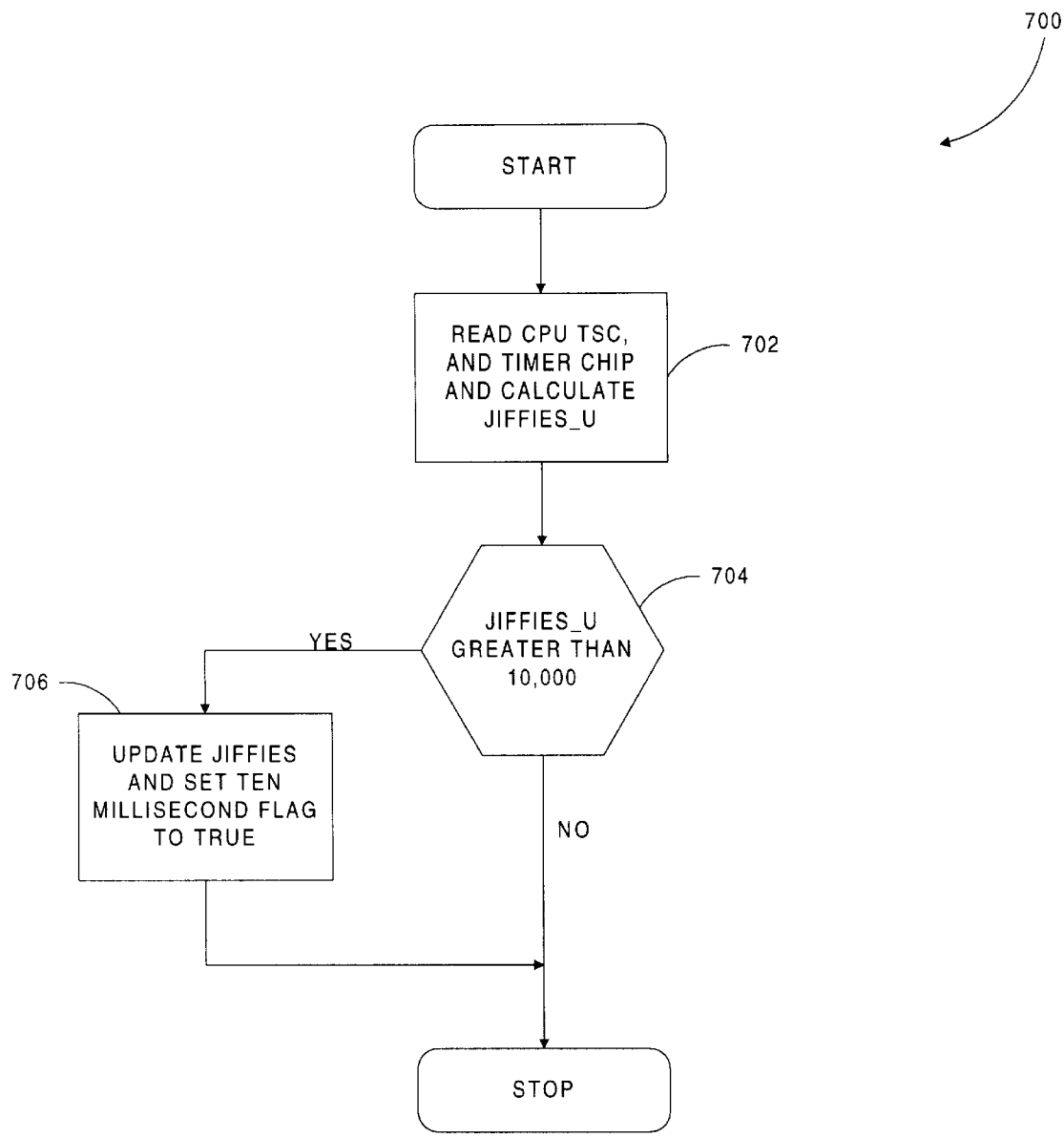
FIG. 7 is a computer program flow chart of the periodic UPDATE subroutine for operating the computer of FIG. 1.

FIG. 7 illustrates UPDATE subroutine 700 for updating the variable JIFFIES_U. This subroutine is called with every interrupt provided by timer chip 24 in order to update the Linux variable JIFFIES (the 10 msec. counter) and the microsecond variable JIFFIES_U. Step 702 calculates JIFFIES_U by determining the difference (in microseconds) between the present value of the microprocessor time stamp counter (TSC) and the TSC value at the previous update and adding this difference to the previous JIFFIES_U value. To determine the difference in TSC values in microseconds, the difference in TSC values is divided by the number of cycles in one usec., which is 100 for a clock speed of 100 MHZ. Each time the remainder is above the number of cycles in one microsecond, JIFFIES_U is incremented by one. Step 704 asks whether JIFFIES_U is greater than 10,000 indicating an accumulated time of 10 ms. If JIFFIES U goes above 10,000 (ten milliseconds), the Linux variable JIFFIES is incremented by one and JIFFIES_U is decremented by 10,000 in step 706. In particular, this step sets a 10 ms. flag as true to provide a yes answer in steps 406 and 510 discussed above. Execution of the Linux do-timer subroutine for 10 ms. interrupts resets this flag to false.

With the description above, it will now be appreciated that the variable JIFFIES_U enables a time resolution to one microsecond for scheduling events such as transmission of ATM packets. Moreover, this is accomplished without increasing the frequency of routine non-event related interrupt subroutine processing by the operating system while still maintaining these periodic interrupts on a time base such as 10 msec. for most operating systems.

FIGS. 8–19 arc computer program flow charts illustrating the subroutines for receiving, processing and storing ATM packets received from network 12. In particular, the packets are received from network 12 by way of ATM switch 14 into computer 10 by way of interface 28.

Figure 8:
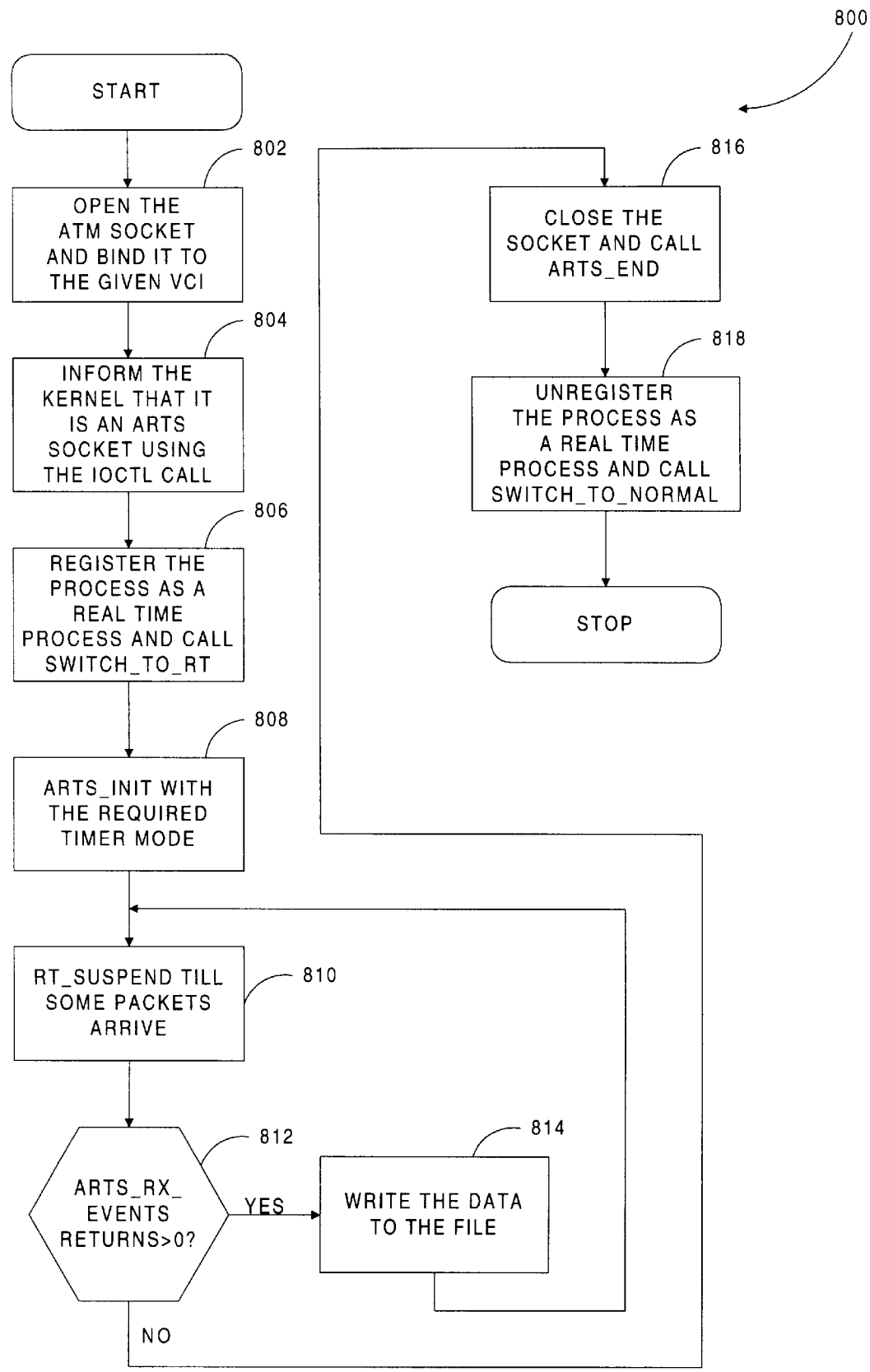
FIG. 8 is a computer program flow chart of the RX_TO_DISK process for operating the computer of FIG. 1.
Figure 9:
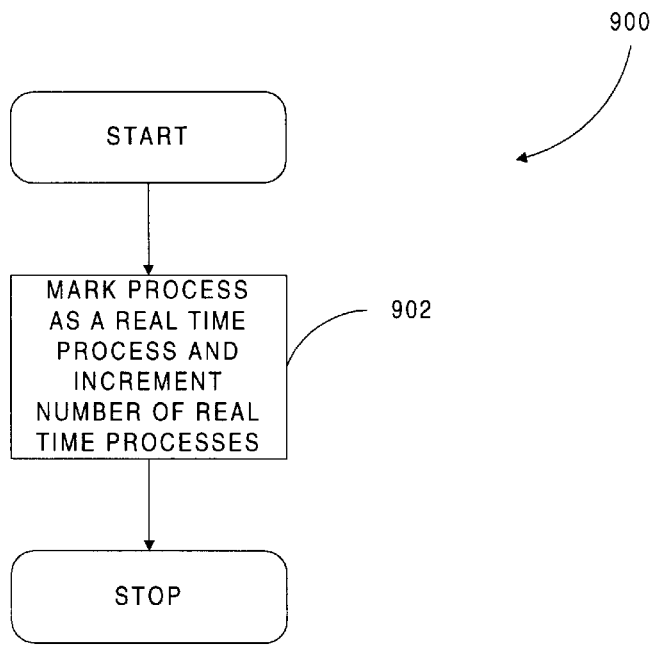
FIG. 9 is a computer program flow chart of the REGISTER subroutine for operating the computer of FIG. 1.
Figure 10:
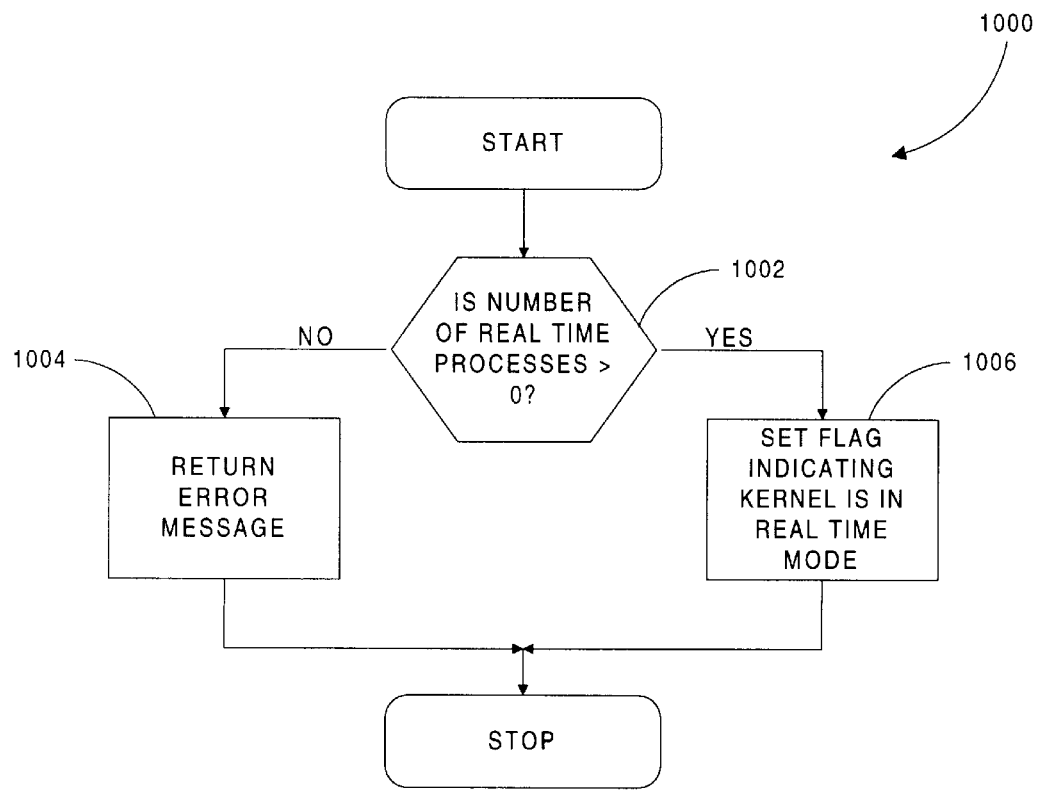
FIG. 10 is a computer program flow chart of the SWITCH_TO_RT subroutine for operating the computer of FIG. 1.
Figure 11:
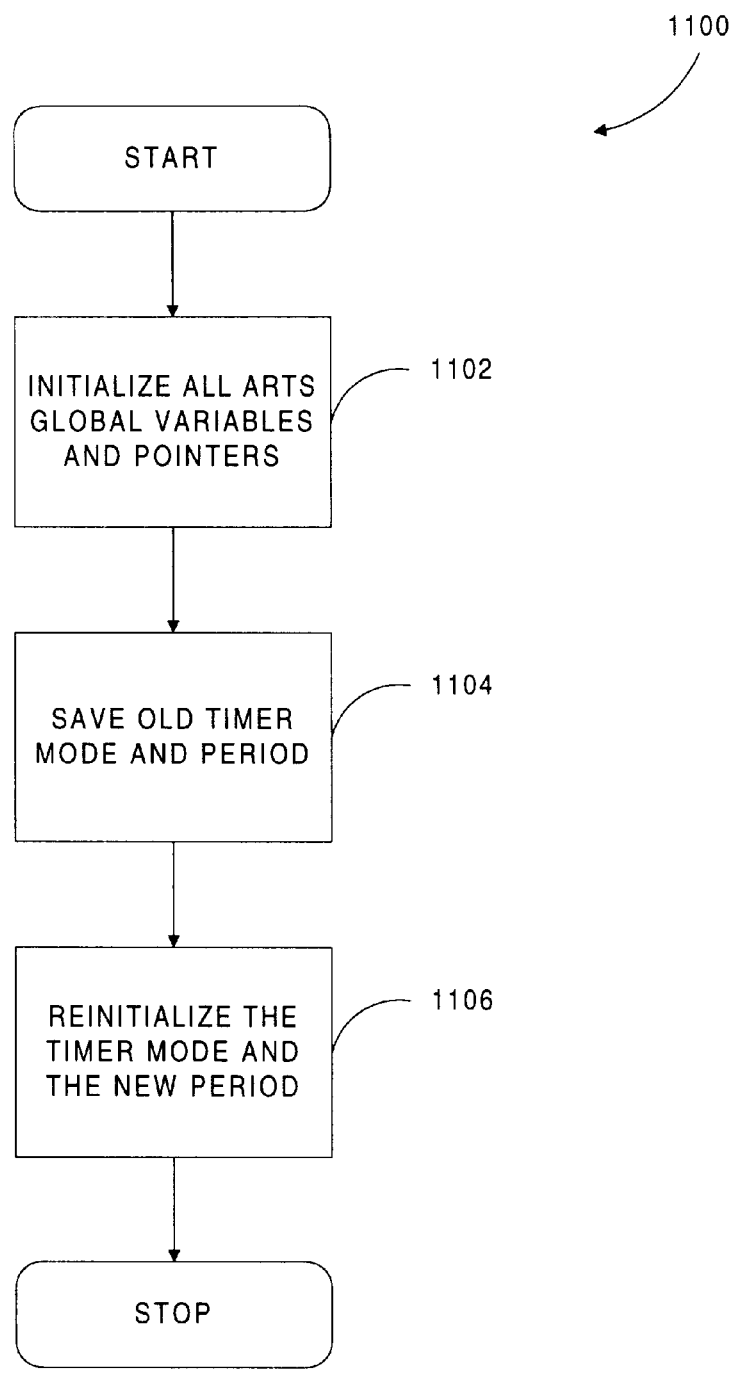
FIG. 11 is a computer program flow chart of the INITIALIZE subroutine for operating the computer of FIG. 1.

FIG. 8 illustrates RX_TO_DISK process 800 for receiving and storing packet information on hard drive 26. Step 802 instructs interface 28 to open an ATM socket with switch 14 and to bind that socket to a specified VCI. This is the VCI about which the operating system kernel will collect data. Data can be collected about packets on several VCI's by opening multiple sockets. Step 804 then informs operating system that the socket is an ARTS socket using the ioctl call. Next, step 806 registers the current subroutine (subroutine 800) by calling REGISTER subroutine 900

(FIG. 9) which marks the current subroutine as a real time (RT) subroutine and increments a counter indicating the number of real time subroutines so marked.

Step 806 next calls SWITCH_TO_RT subroutine 1000 (FIG. 10) which switches the operating system kernel to the real time mode so that only user processes designated as real time subroutines are run. Other user processes such as word processing and spreadsheets are not designated as real time processes are suspended. In subroutine 1000, step 1002 asks whether the number of real time processes is greater than zero. If the answer is no, an error message is sent in step 1004. This is so that the kernel does not go into real time mode without any processes being marked as real time. If the answer in step 1002 is yes, step 1006 sets a flag indicating that the operating system kernel is in a real time mode.

Step 808 then calls INITIALIZE subroutine 1100 (FIG. 11) which begins at step 1102 by initializing all of the global variables and pointers. Step 1104 then saves the old timer mode and period and 1106 reinitializes the timer mode and new period.

Figure 12:
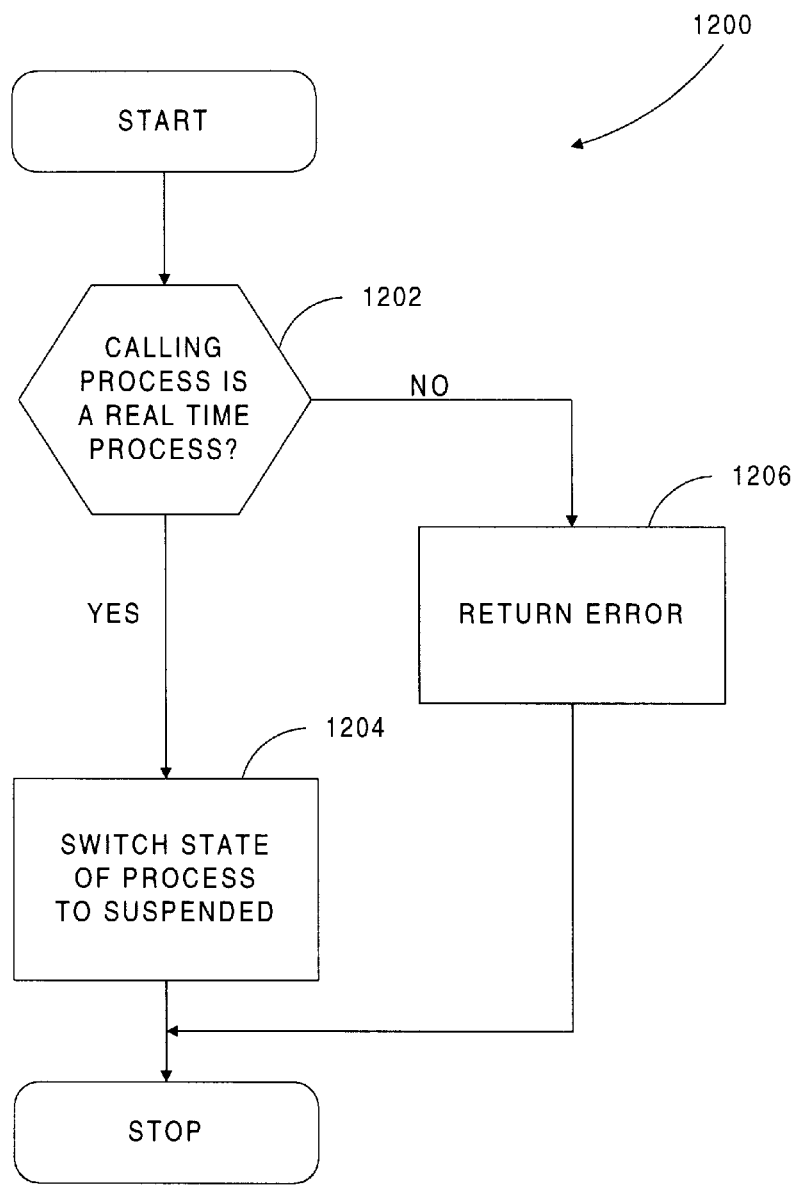
FIG. 12 is a computer program flow chart of the SUSPEND subroutine for operating the computer of FIG. 1.

Step 810 then suspends process 800 until packets have been received by calling SUSPEND subroutine 1200 (FIG. 12). This subroutine enters at step 1202 which asks whether the calling subroutine is a real time subroutine. Normally this is true because the current subroutine has been so designated in step 902. If the answer is yes, step 1204 switches the state of the current process to suspended. If the answer is no, step 1206 sends an error message.

Figure 13:
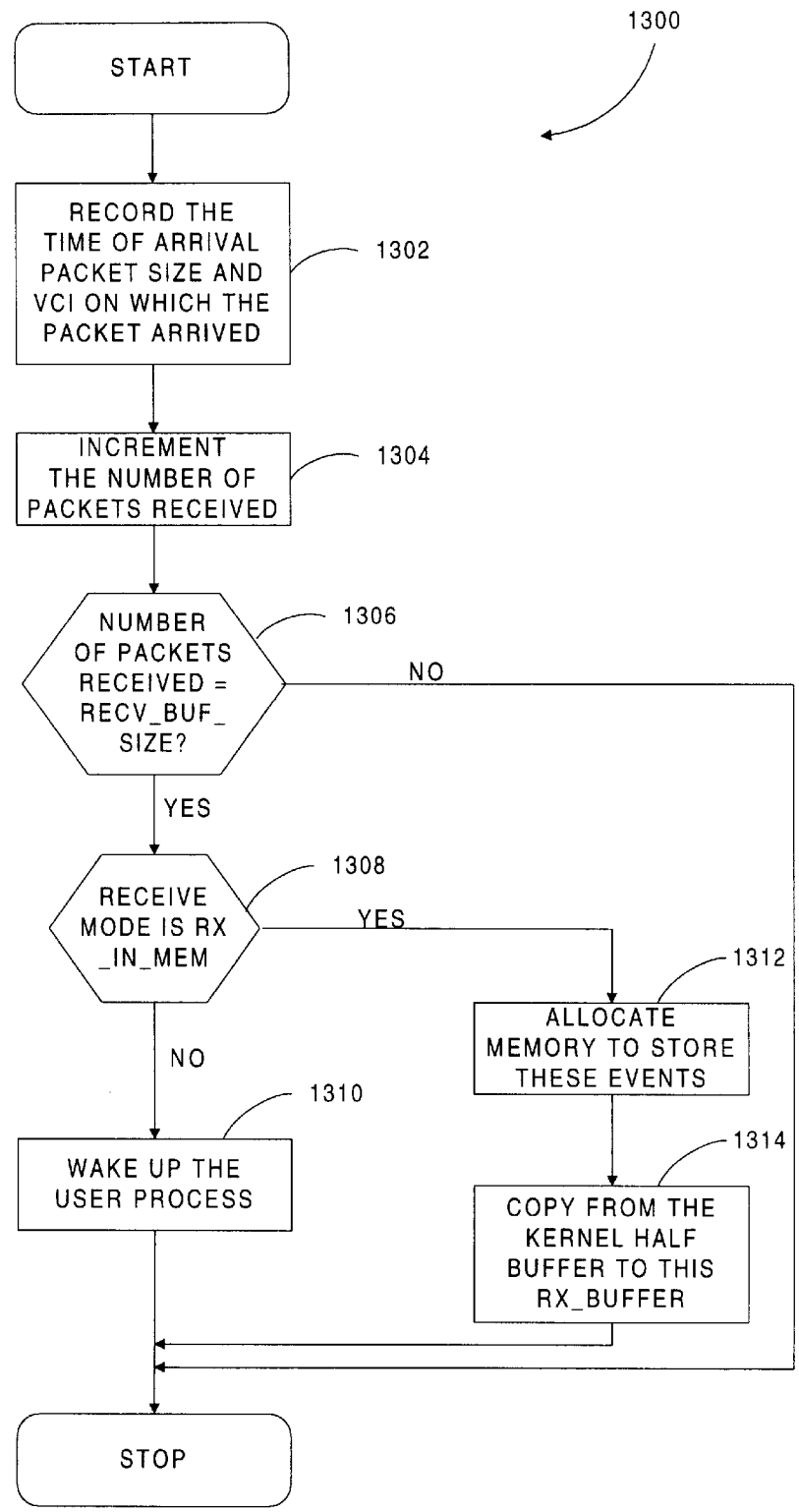
FIG. 13 is a computer program flow chart of the RX_INTERRUPT interrupt service routine for operating the computer of FIG. 1.
Figure 14:
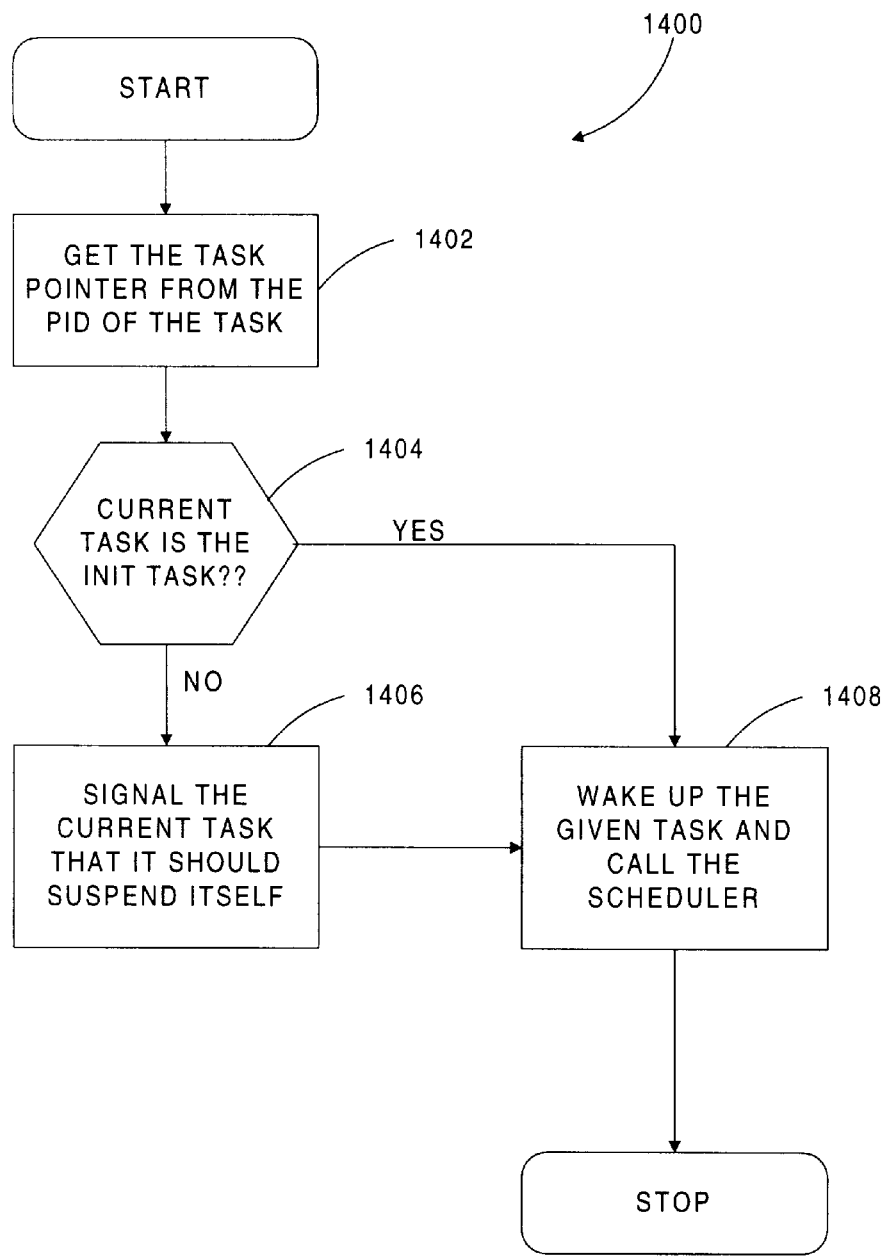
FIG. 14 is a computer program flow chart of the WAKE_UP subroutine for operating the computer of FIG. 1.

FIG. 13 illustrates RX_INTERRUPT throughout subroutine 1300 which responds to the arrival of a packet by way of interface 28. When the packet is received, interface 28 determines the packet size and the VCI and provides this information as packet information in step 1302. This step also records the time of arrival by marking the TSC time from microprocessor 18 as time data for inclusion with the packet information. Step 1304 then increments a counter designating the number of packets that have been received.

Next, step 1306 asks whether the number of packets received exceeds the kernel buffer size. The kernel space is divided into two half buffers to allow receipt of packet information into one buffer while the other buffer is being emptied. If the answer in step 1306 is no, then space remains in the buffer and subroutine 1300 stops and waits for the arrival of additional packet information. If, however, the received buffer is full, the answer in step 1306 is yes and step 1308 asks whether the receiving subroutine is RX_TO_MEM (FIG. 19), which is the subroutine for storing packet information in RAM 22. The current subroutine, however, is for receipt to disk and thus, the answer in step 1308 is no.

Figure 15:
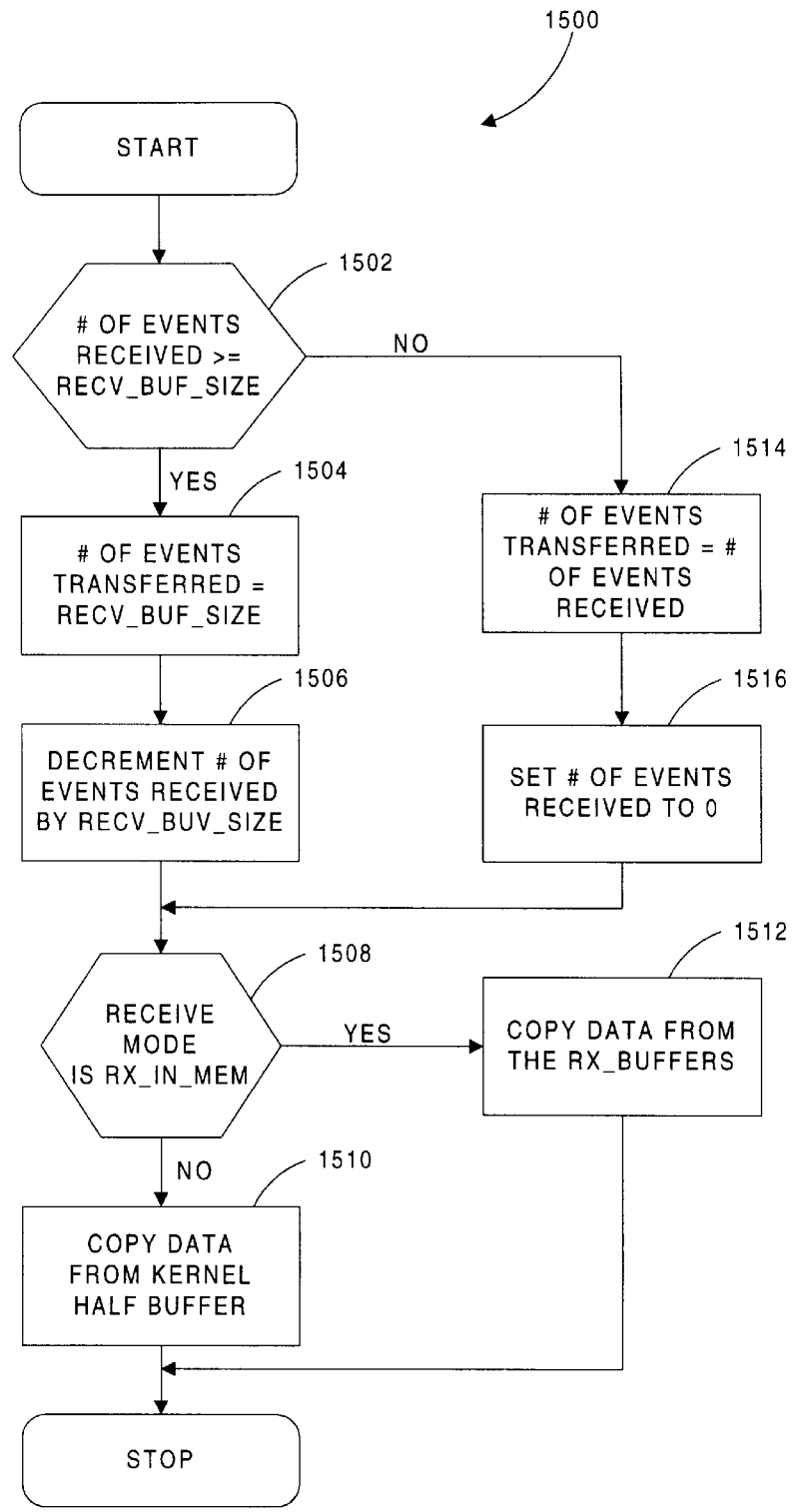
FIG. 15 is a computer program flow chart of the RX_EVENTS subroutine for operating the computer of FIG. 1.
Figure 16:
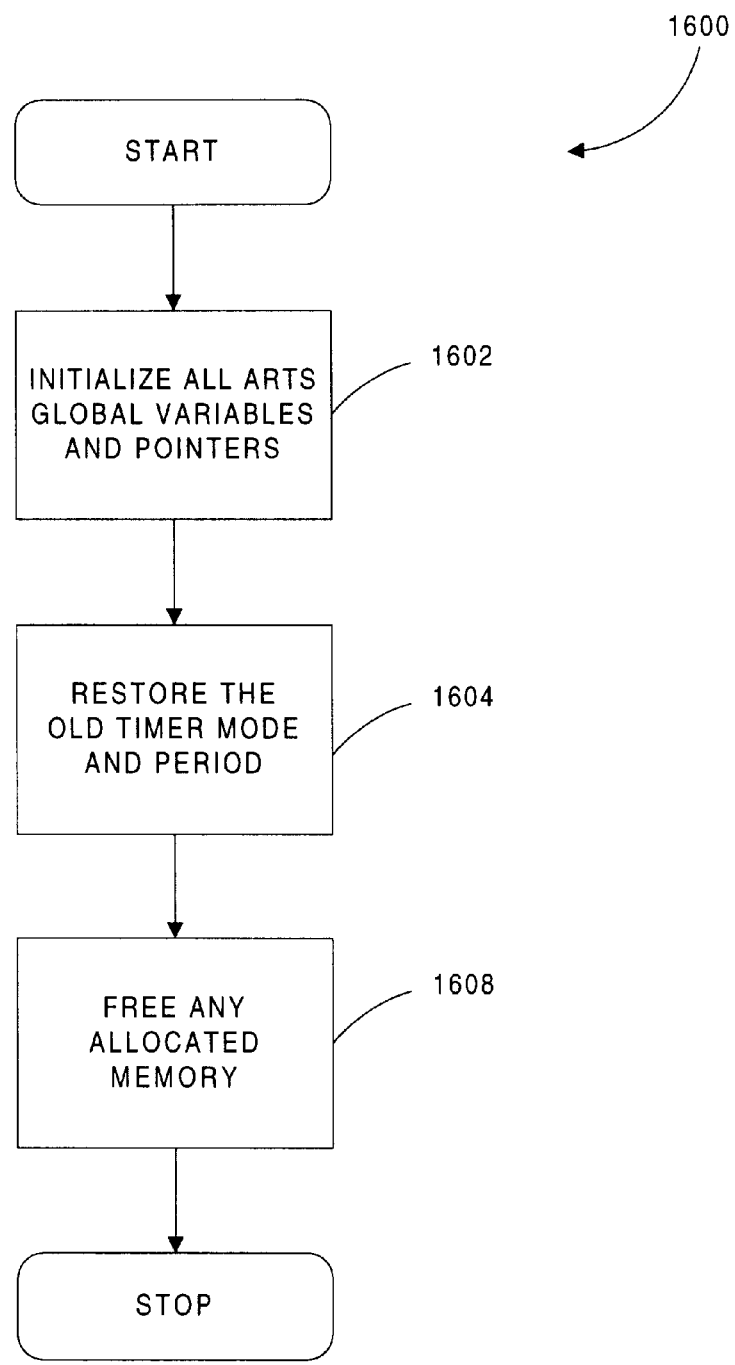
FIG. 16 is a computer program flow chart of the END subroutine for operating the computer of FIG. 1.
Figure 17:
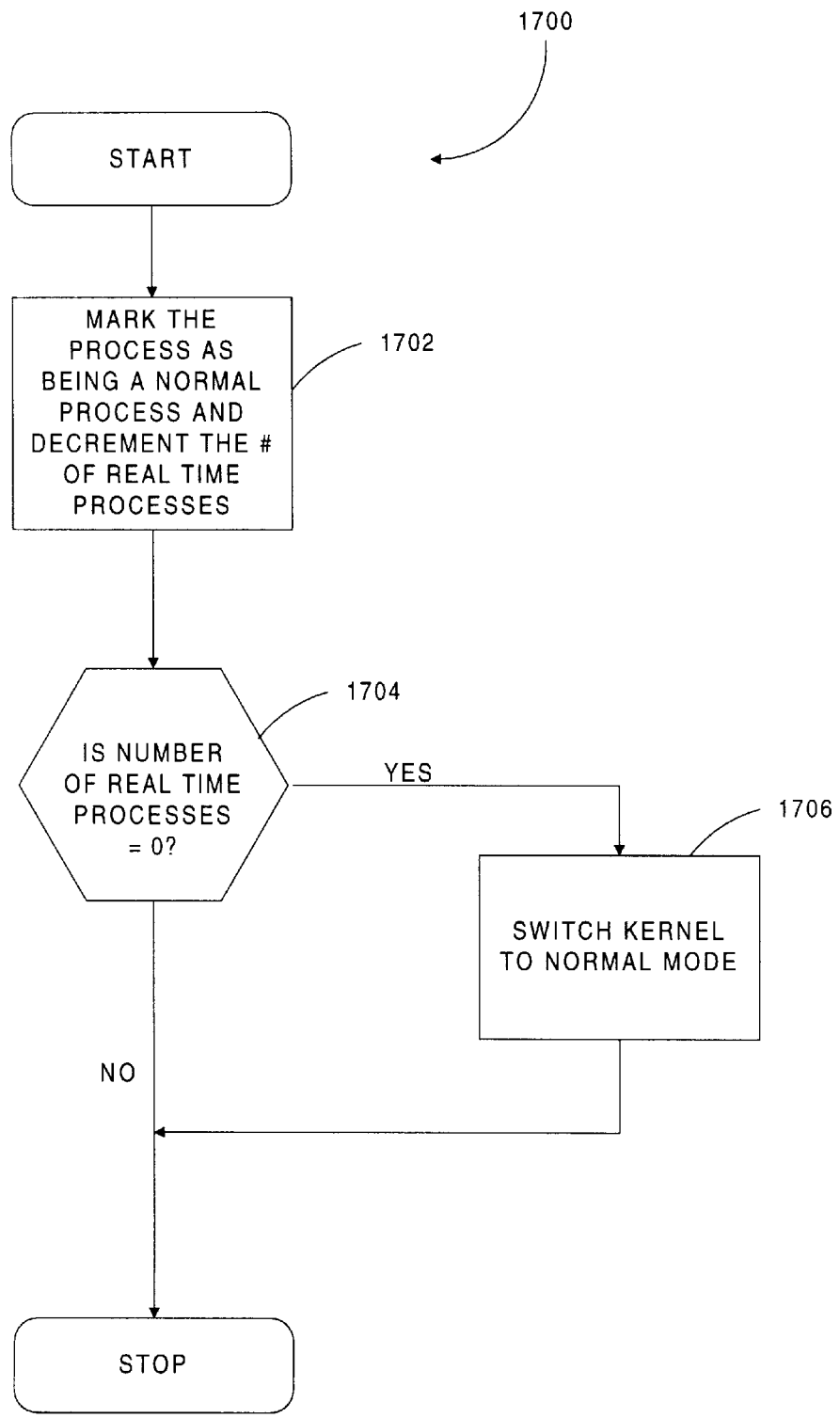
FIG. 17 is a computer program flow chart of the UNREGISTER subroutine for operating the computer of FIG. 1.
Figure 18:
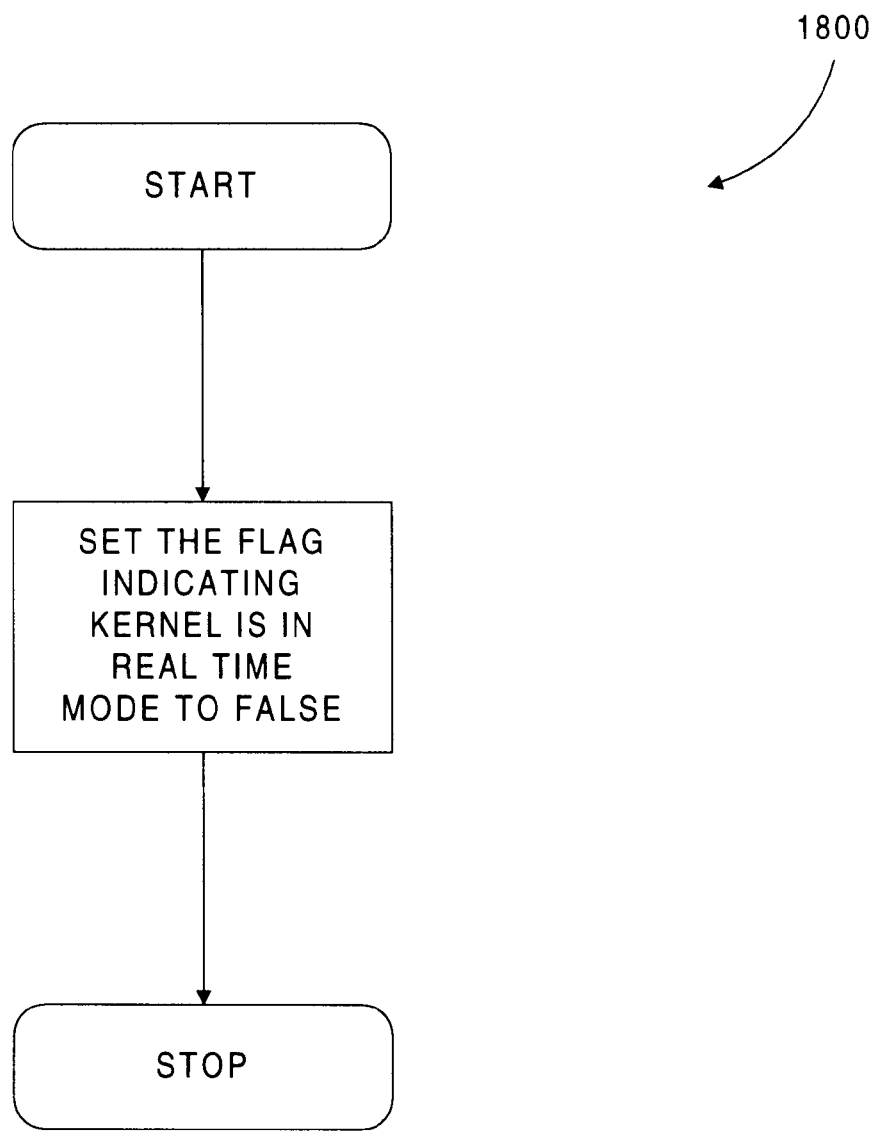
FIG. 18 is a computer program flow chart of the SWITCH_TO_NORMAL subroutine for operating the computer of FIG. 1.

Step 1310 then wakes up the current subroutine (subroutine 800) at step 812 which asks whether the number of receive events is greater than zero indicating that data is available to be stored. If yes, step 814 writes to disk the data in the receive buffer thereby emptying this buffer by calling RX_EVENTS subroutine 1500 (FIG. 15).

In subroutine 1500, step 1502 asks whether the number of events received is greater than or equal to receive buffer size. If yes, step 1504 sets the number of events transferred equal to the receive buffer size and step 1506 decrements the number of events received by this same number. Step 1508 then asks whether the receive mode is RX_TO—MEM. The current subroutine 800 is for disk storage and so the answer is no. Step 510 then copies the data from the kernel half buffer to disk. If the receive mode is RX_TO_MEM (discussed in connection with FIG. 19), the answer in step 1508 is yes and step 1512 copies the data from the kernel half buffer to user space in RAM 22.

In step 1502, the answer is no if the user enters a stop command by way of the keyboard. If such occurs, step 1514 sets the number of events transferred equal to the number of events received and then, step 1516 sets the number of events received to zero. After storing to disk in subroutine 1500, process 800 then returns to step 810 for suspension until the receive buffer is again full.

Steps 810–814 continue to repeat and store packet information on disk (hard drive 26) until an interrupt signal is received from the user by way of the keyboard. In this event, one more loop through steps 810–814 usually will occur to empty the receive buffer after which the answer in step 812 is no.

Step 816 then closes the ATM socket and calls END subroutine 1600 (FIG. 16) which re-initializes the global variables and pointers in step 1602. Step 1604 then restores the old timer mode and period previously saved in step 1104 and frees any allocated memory in step 1608.

Next, step 818 calls UNREGISTER subroutine 1700 (FIG. 17), which marks the current subroutine as normal and decrements the number of real time subroutines in step 1702. Step 1704 then asks whether the number of real time subroutines equal zero. Normally only one real time subroutine will have been so designated, and the answer in step 1704 is yes. Step 1706 then switches the operating system kernel to the normal mode allowing it to resume conventional operation. Step 818 then calls SWITCH_TO_NORMAL subroutine 1800 (FIG. 18) which sets the real time flag to false. Subroutine 800 then stops.

Figure 19:
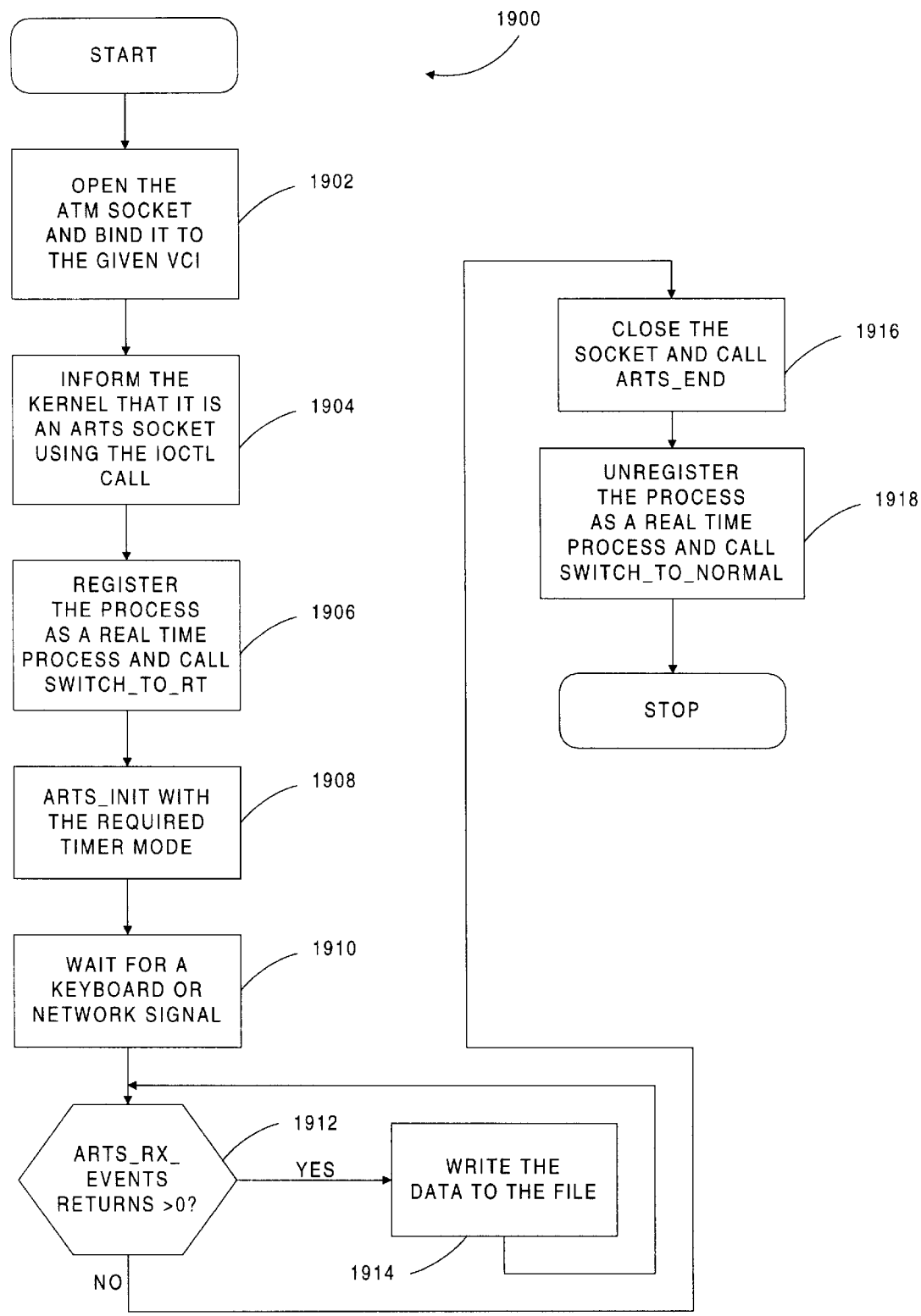
FIG. 19 is a computer program flow chart of the RX_TO_MEM process for operating the computer of FIG. 1.

FIG. 19 illustrates RX_TO_MEM process 1900 which is the subroutine for storing packet information in memory rather than to disk. This process is selected when sufficient memory is available and to avoid the delay of storing information to disk. Steps 1902–1918 of subroutine 1900 are the same as steps 802–818 in subroutine 800 (FIG. 8) except that the packet information is stored to memory instead of to disk. More specifically, when running process 1900, the answer in step 1308 (FIG. 13) is yes. Step 1312 then allocates memory in RAM 32 to store data in memory instead of waking up the user subroutine. Step 1314 then copies the packet information from the full half buffer to the allocated memory. In other words, packet information is continually transferred to the allocated space in RAM 22 instead of waking up the user process for storing to disk. Also, with process 1900, the answer in step 1508 (FIG. 15) is yes and step 1512 is executed instead of step 1510.

The subroutines illustrated in FIGS. 20–26 are for transmitting packets using stored packet information. The preferred packet information includes size data indicating the number of data bytes to be included in the packet, time data indicating when the packet should be transmitted, and channel data indicating the VCI for the packet. Upon receipt of the size and channel data, interface 28 creates a packet according to the size data and transmits it with the VCI as indicated by the channel data to switch 14.

As discussed further herein, the packets can be transmitted on a schedule configured in accordance with the time data. In the preferred embodiment, the packet information is derived from actual packets received from network 12, such as the packet information stored as a result of the receive packet subroutines described above. It will also be appreciated that the packet information could be synthetically generated as well.

Figure 20:
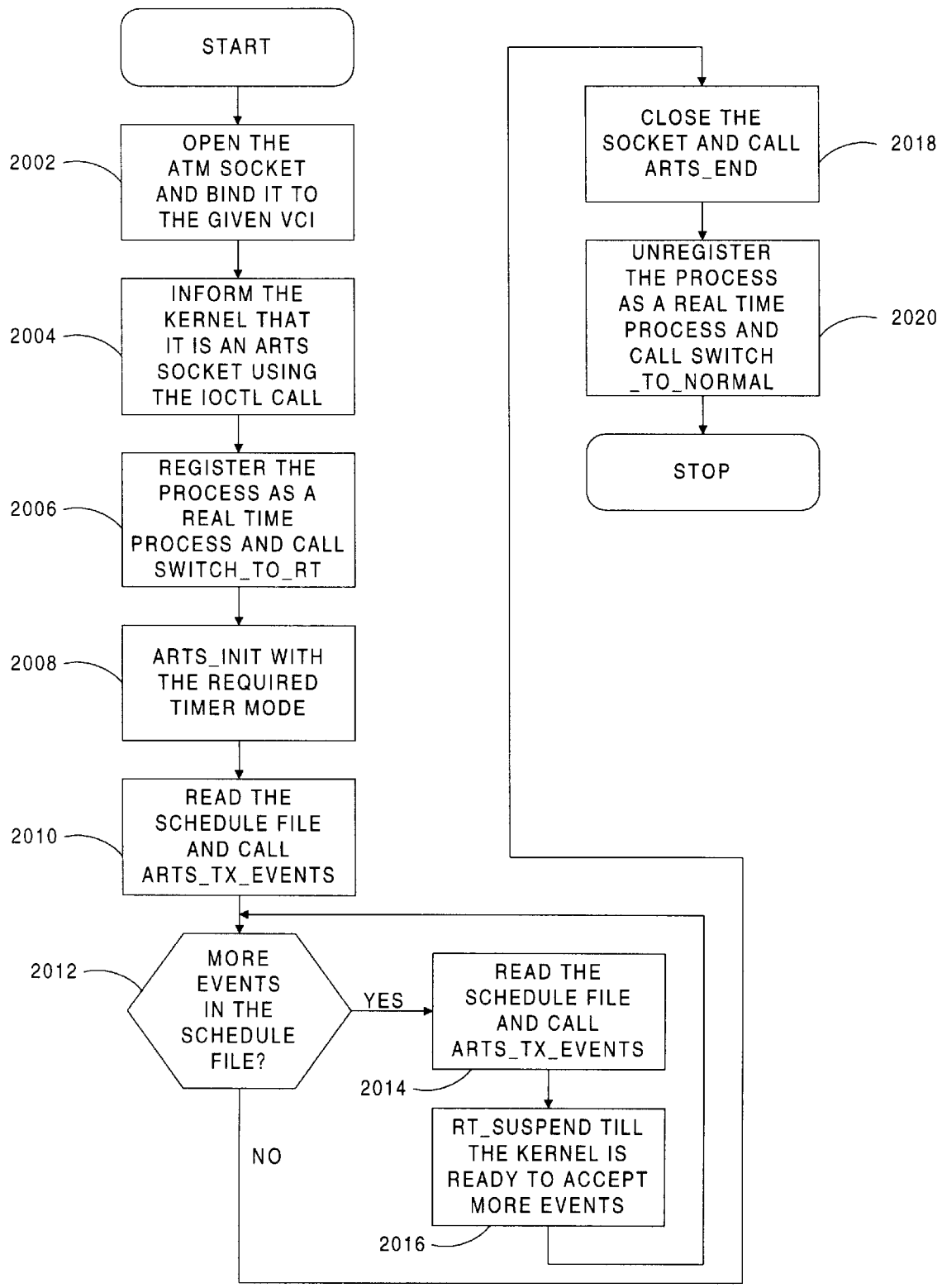
FIG. 20 is a computer program flow chart of the SCHEDULE_TX_FROM DISK process for operating the computer of FIG. 1.

FIG. 20 illustrates SCHEDULE_TX_FROM_DISK process 2000 which retrieves packet information from hard drive 26 and transmits the packets on a schedule configured according to the time data. Steps 2002, 2004, 2006 and 2008 are the same as steps 802–808 discussed above in connection with FIG. 8.

Figure 21:
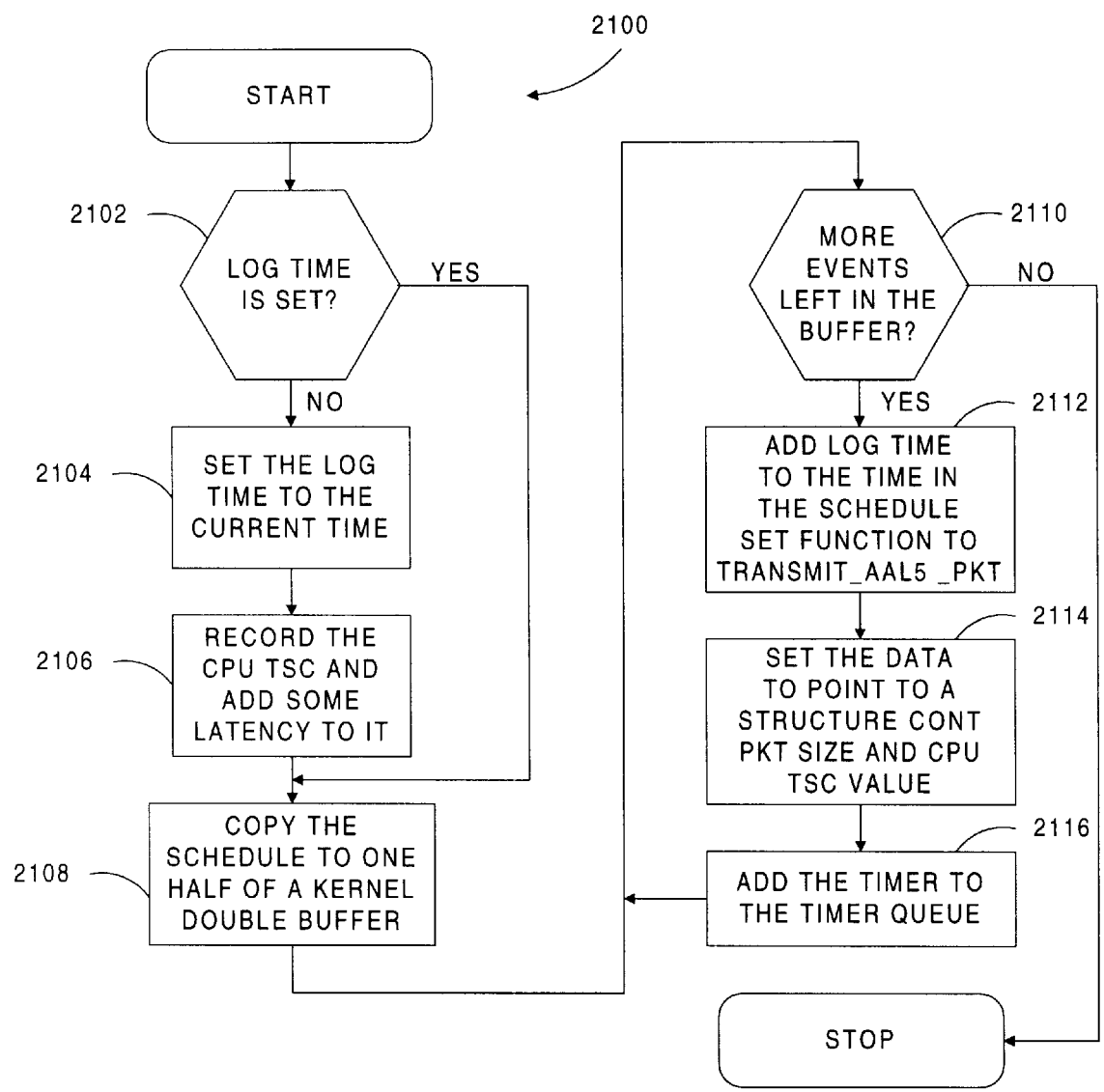
FIG. 21 is a computer program flow chart of the ONE_TIME_TX subroutine for operating the computer of FIG. 1.
Figure 22:
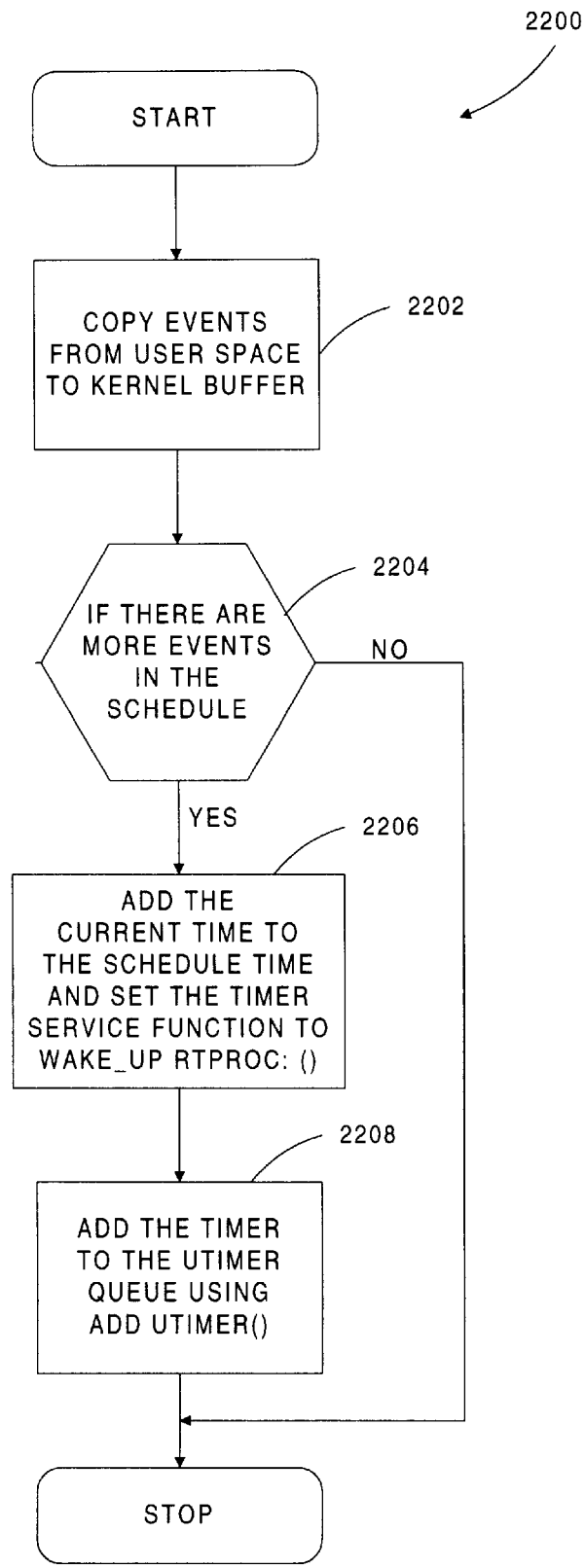
FIG. 22 is a computer program flow chart of the SCHEDULE_RT subroutine for operating the computer of FIG. 1.

Step 2010 reads the transmission schedule in hard drive 26 and calls ONE_TIME_TX subroutine 2100 (FIG. 21). This is the subroutine to transmit the schedule of packets one time. In the cyclic mode, the present invention allows the schedule to be repeated as described in connection with FIG. 24.

Subroutine 2100 enters at step 2102 which asks whether the log time is set. The log time is the starting time for beginning the packet transmissions. That is, the scheduled transmission is expressed relative to this log time and needs to be set only once per schedule. If this is the first time through subroutine 2100, the answer in step 2102 is no and step 2104 sets the log time equal to the current time as indicated by the TSC of microprocessor 18. Step 2106 reads the TSC and adds a predetermined amount of latency time to allow for program processing time before the first packet is ready for sending.

Step 2108 then copies as much of the packet transmission schedule to the kernel half buffer as will fit, which is the information for about 146 packets. Step 2110 then asks whether there are any more packets in the buffer to be added to the timer queue. If the answer is no, all events scheduled in step 2018 have been added to the timer queue.

If the answer in step 2110 is yes, however, step 2112 adds the log time (starting time as indicated by the TSC) to the schedule. Step 2116 then adds the timer configured in steps 2114 to the timer queue. The process then returns to step 2110 to determine whether there are any more timers to be configured and continues to loop through steps 2110–2116 until all the timers have been configured for the packet information in the current buffer. The answer in step 2110 is then no and the process returns to step 2012 (FIG. 20).

The process then returns to step 2012 which asks whether there are more events to be processed in the schedule file on hard drive 26. If yes, step 2014 reads the file and again calls subroutine 2100 in order to add more events to the kernel buffer. Step 2016 then calls SUSPEND subroutine 1200 (FIG. 12) which suspends subroutine 2000 until the kernel is ready to accept more events. When there are no more events to be processed, the answer in step 2012 is no, and steps 2018 and 2020 are executed the same as steps 816 and 818 discussed above.

Figure 23:
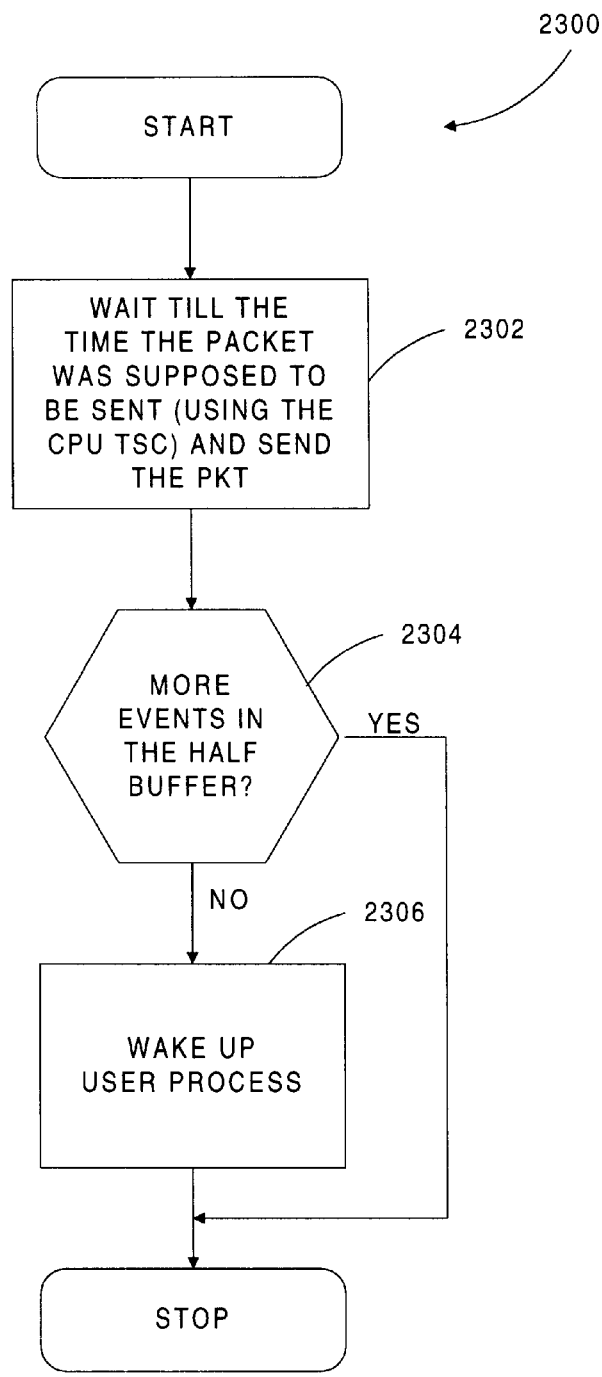
FIG. 23 is a computer program flow chart of the TX_INTERRUPT interrupt service routine for operating the computer of FIG. 1.

FIG. 23 illustrates TX_INTERRUPT subroutine 2300 which is the subroutine for transmitting the packets from the kernel half buffer. Step 2302 monitors the packet timers in the queue using the variables JIFFIES and JIFFIES_U to determine timer expiration to the nearest microsecond as discussed above in accordance with the TSC of microprocessor 18. When the timer expires, step 2302 sends the size data and channel data to interface 28 which creates and launches the packet.

Step 2304 then asks whether there are more events in the half buffer, that is, asks whether there are more timers in the timer queue. If yes, the subroutine stops and waits for another timer to expire. If the answer in step 2304 is no, this indicates that the buffer is empty and more data is needed. Step 2306 then calls WAKE_UP subroutine 1400 (FIG. 14) in order to resume subroutine 2000.

WAKE_UP subroutine 1400 enters at step 1402 which retrieves the task pointer from the subroutine identification of the task, which, in this case, identifies process 2000. Step 1404 then asks whether the current task is the "init" task. If no, step 1406 suspends the current task. Then step 1408 wakes up the retrieved task which is subroutine 2000.

Process 2000 continues to loop through steps 2012–2016 until all of the packets have been sent according to the schedule on hard drive 26. Steps 2014 and 2016 close the subroutine and return the operating system to the normal mode the same as steps 816–818 described in connection with FIG. 8.

Figure 24:
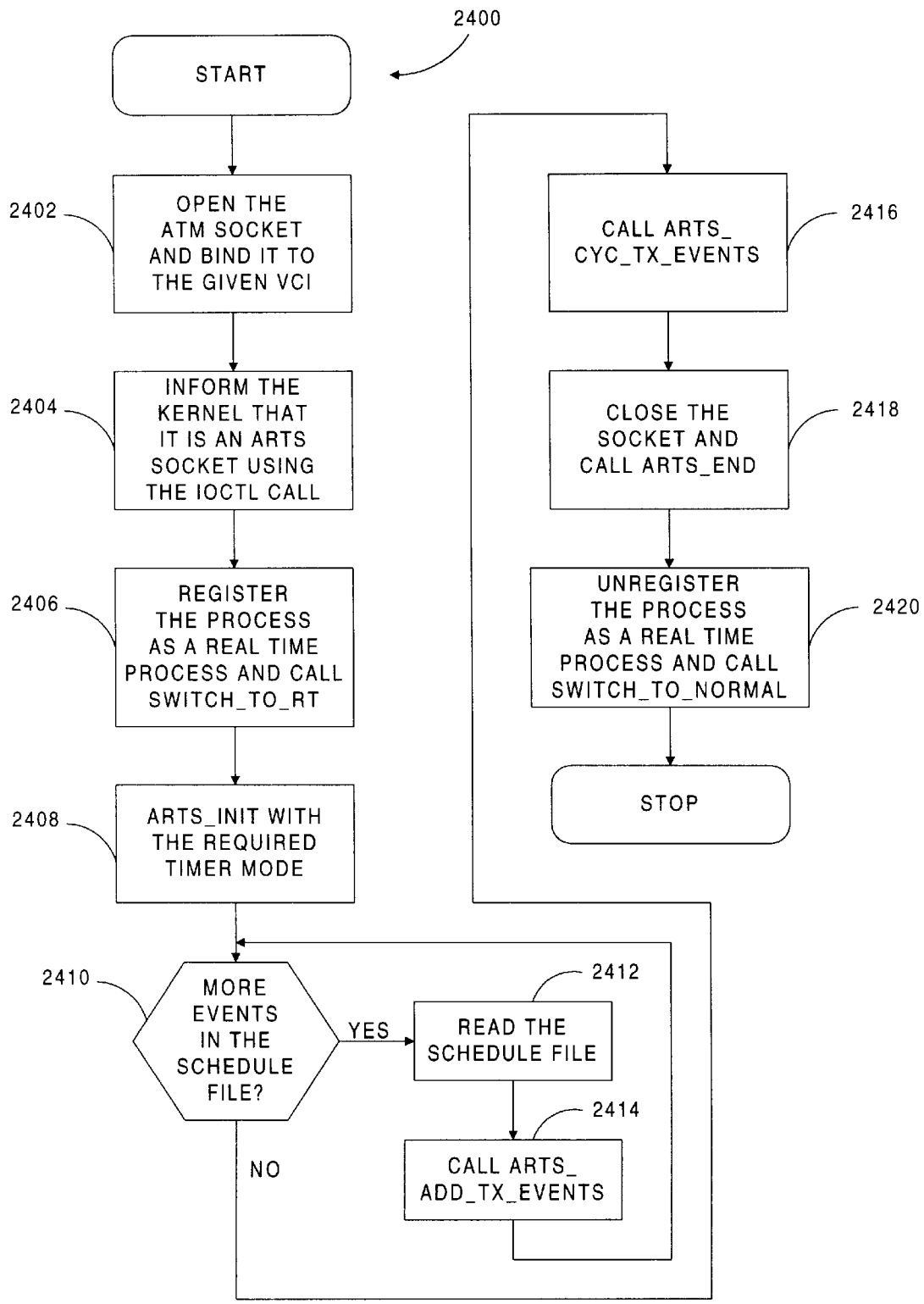
FIG. 24 is a computer program flow chart of the CYCLIC_TX process for operating the computer of FIG. 1.
Figure 25:
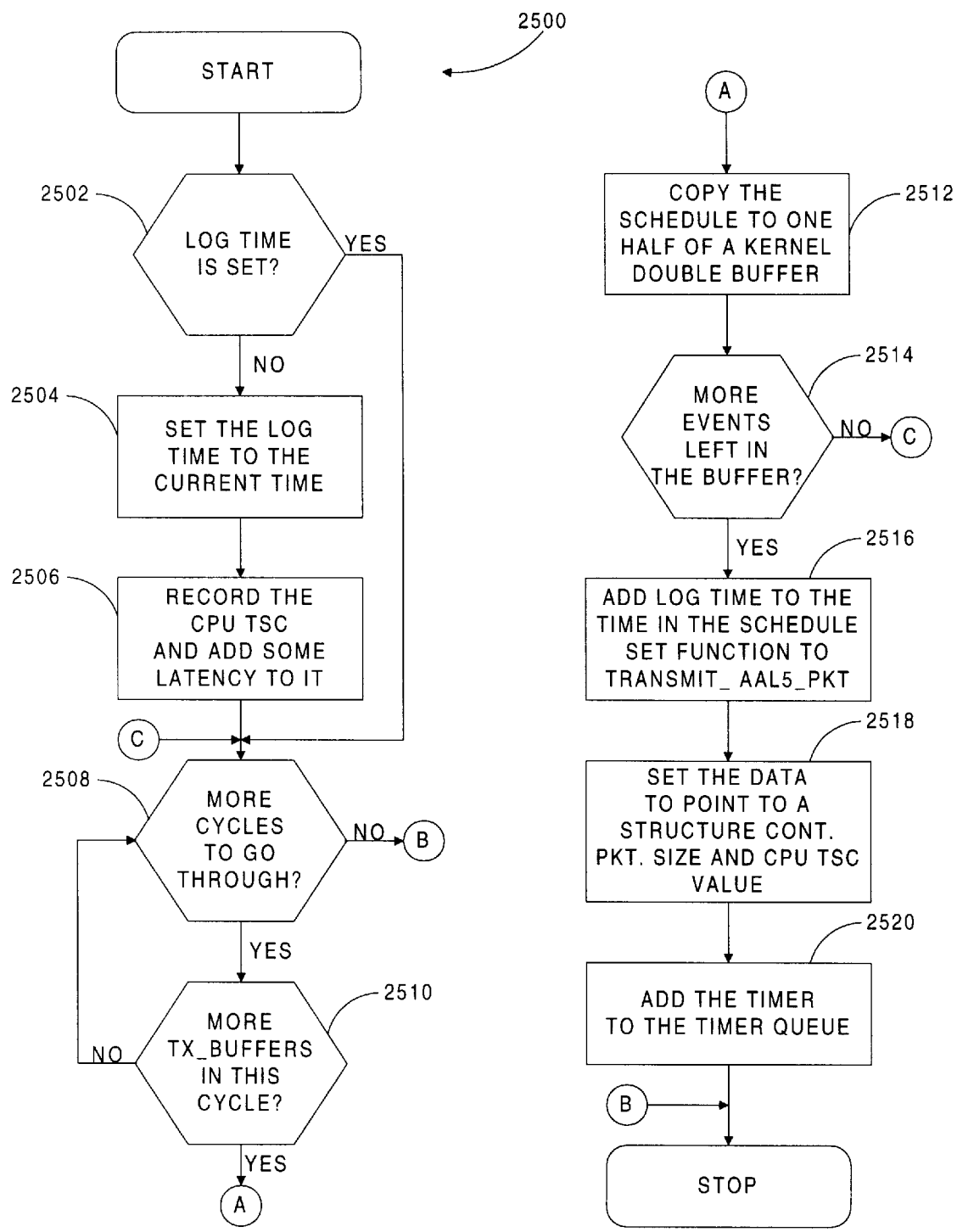
FIG. 25 is a computer program flow chart of the TX_PACKETS subroutine for operating the computer of FIG. 1.

FIG. 24 illustrates CYCLIC_TX process 2400 which is similar to subroutine 2000 except that the packet schedule can be repeated any number of times as designated by the user in order to provide a greater packet output. Additionally, this subroutine reads events from memory instead of disk. Steps 2402, 2404, 2406 and 2408 are the same as steps 2002–2010 described above in connection with FIG. 20.

Figure 26:
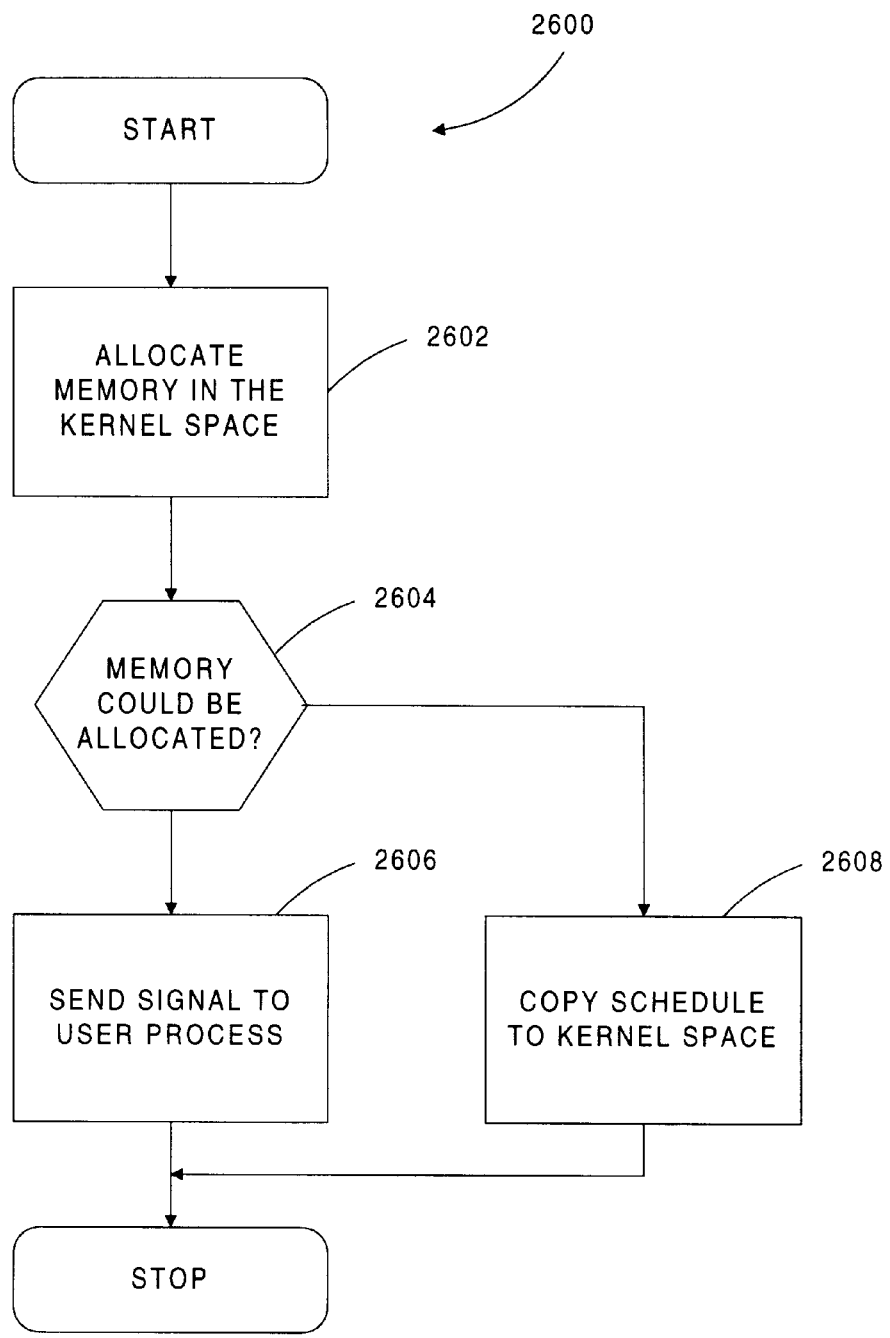
FIG. 26 is a computer program flow chart of the ADD_TX_EVENTS subroutine for operating the computer of FIG. 1.

Step 2410 asks whether there are events in the schedule file stored in memory (RAM 22). If yes, step 2412 reads the schedule file and then step 2414 calls ADD_TX_EVENTS subroutine 2600 (FIG. 26). Step 2602 allocates space in the kernel memory for the packet events. Step 2604 then asks whether the memory could be allocated. If no, step 2606 signals an error message to the user subroutine. If yes, step 2608 copies as much of the schedule as will fit in the allocated space which is typically 146 packet transmission events.

Subroutine 2600 then stops and returns to process 2400 which continues to loop through steps 2410–2414 until all the packets in the schedule have been transmitted. When this occurs, the answer in step 2410 is no.

Step 2416 then calls ADD_TX_EVENTS subroutine 2500 (FIG. 25) in order to cycle through the event schedule again. In subroutine 2500, steps 2502, 2504 and 2506 are the same as steps 2102–2106 described in connection with FIG. 21.

Step 2508 asks whether the schedule events is to be cycled again. If no, subroutine 2500 stops. If yes, step 2510 asks whether there are more transmit buffers in the current cycle. If no, the subroutine returns to step 2508.

If the answer in step 2510 is yes, the subroutine executes steps 2512, 2514, 2516, 2518 and 2520 which are the same as steps 2202–2208 described above in connection with FIG. 22. Subroutine 2500 then stops and returns to process 2400 to execute steps 2418 and 2420, which are the same as steps 2014 and 2016 described above in connection with FIG. 20.

Figure 27:
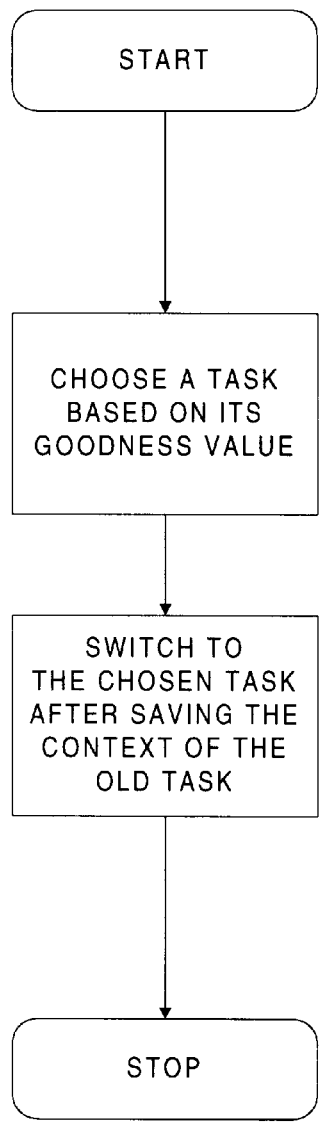
FIG. 27 is a computer program flow chart of the SCHEDULER subroutine for operating the computer of FIG. 1.
Figure 27:
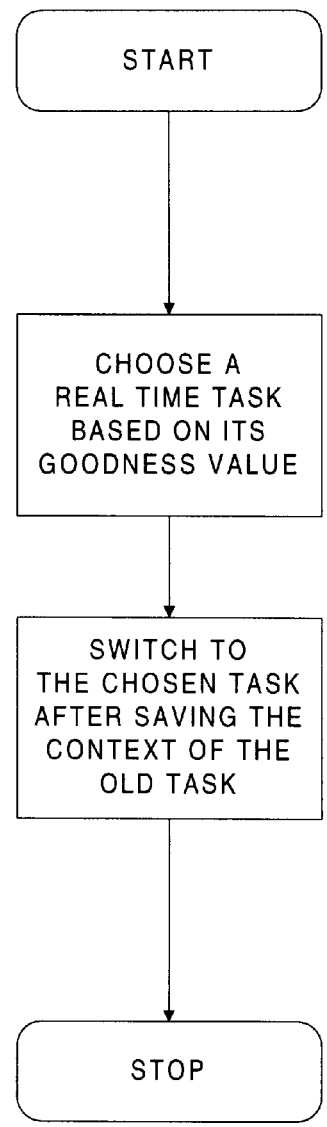

FIG. 27 illustrates modifications to the Linux operating system so that only processes designated as real time subroutines are executed. Normally the Linux system chooses tasks based on a priority basis. As illustrated in FIG. 27, the operating system is modified to choose only "real time" processes on a priority basis, but in the preferred embodiment only one process at a time is designated as a real time process. In this way, only the designated real time user subroutines are operated in order to achieve the precision scheduling of packet transmissions.

Figure 28:
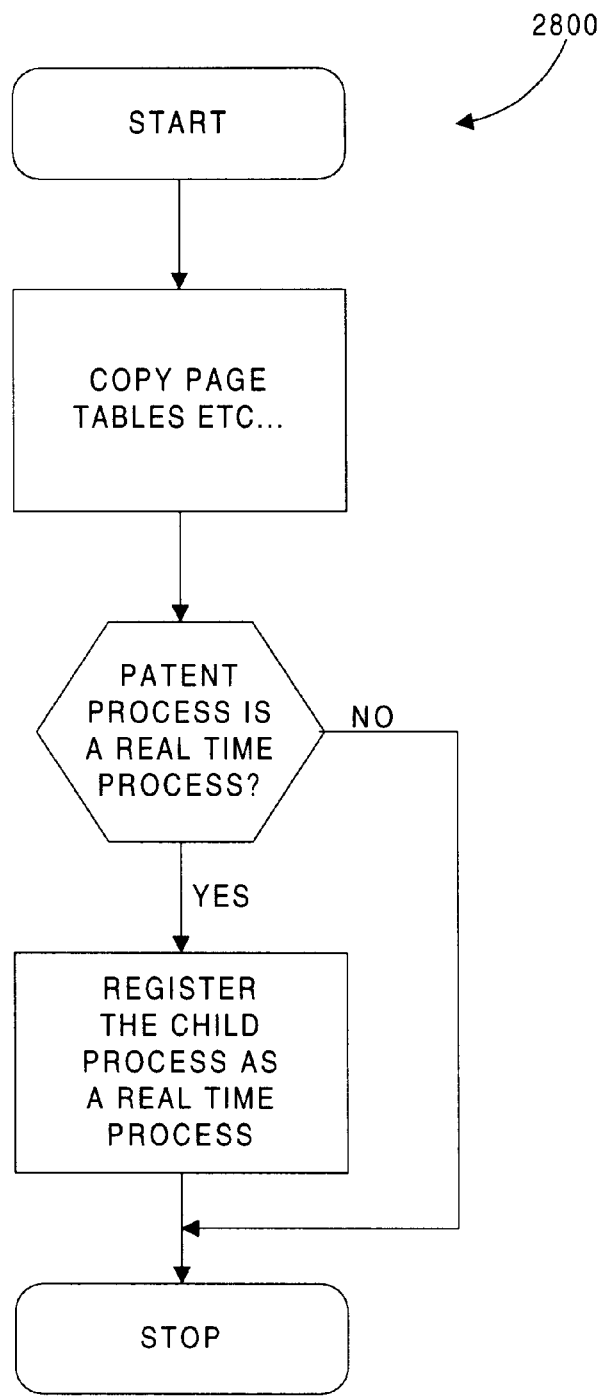
FIG. 28 is a computer program flow chart of the RT_FORK subroutine for operating the computer of FIG. 1.

FIG. 28 illustrates RT_FORK subroutine 2800 which is used to register a subroutine as real time when the parent subroutine has already been designated as a real time subroutine. Thus, when a given process creates other processes, these called processes are also designated as real time processes.

Figure 29:
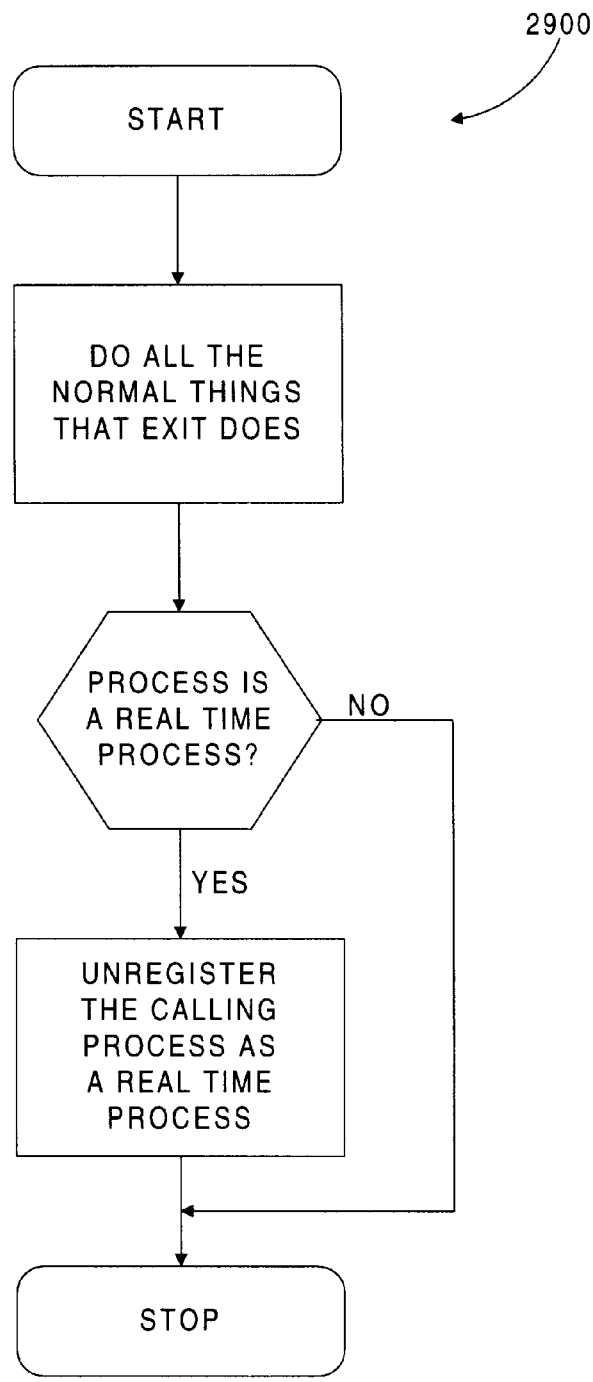
FIG. 29 is a computer program flow chart of the EXIT_RT subroutine for operating the computer of FIG. 1.

FIG. 29 illustrates EXIT_RT subroutine 2900, which is executed when exiting any of the real time processes described above. This ensures that the Linux operating system is restored to its normal operating mode upon completion of the real time processes described above.

Having thus described the preferred embodiment of the preferred invention, the following is claimed as new and desired to be secured by Letters Patent:

1. A method for providing ATM traffic from a computer controlled by an operating system, wherein the operating system tracks time at a particular time resolution when it is unmodified, the method comprising:

modifying the operating system to track time at a greater time resolution than the particular time resolution of the unmodified operating system;

receiving ATM packets into the computer and storing time data for the ATM packets using the greater time resolution of the modified operating system; and transmitting ATM packets from the computer using the stored time data and the greater time resolution of the modified operating system.

2. The method of claim 1 wherein the greater time resolution of the modified operating system is at least one microsecond.

3. The method of claim 1 wherein the particular time resolution of the unmodified operating system is ten miliseconds.

4. The method of claim 1 further comprising storing data sizes for the ATM packets received into the computer and wherein transmitting the ATM packets further comprises using the stored data sizes.

5. The method of claim 1 further comprising storing virtual connection information for the ATM packets received into the computer and wherein transmitting the ATM packets further comprises using the stored virtual connection information.

6. The method of claim 1 wherein the modified operating system also tracks time at the particular time resolution of the unmodified operating system.

7. The method of claim 1 further comprising restricting subroutines executed by the computer when the ATM packets are received into the computer.

8. The method of claim 1 further comprising restricting subroutines executed by the computer when the ATM packets are transmitted from the computer.

* * * * *